United States Patent
Osato

(10) Patent No.: US 10,310,286 B2
(45) Date of Patent: Jun. 4, 2019

(54) CIRCULARLY POLARIZING PLATE, METHOD FOR PRODUCING SAME, BROADBAND LAMBDA/4 PLATE, ORGANIC ELECTROLUMINESCENT DISPLAY DEVICE, AND LIQUID CRYSTAL DISPLAY DEVICE

(71) Applicant: ZEON CORPORATION, Chiyoda-ku, Tokyo (JP)

(72) Inventor: Kazuhiro Osato, Tokyo (JP)

(73) Assignee: ZEON CORPORATION, Chiyoda-ku, Tokyo (JP)

(*) Notice: Subject to any disclaimer, the term of this patent is extended or adjusted under 35 U.S.C. 154(b) by 0 days.

(21) Appl. No.: 15/512,192

(22) PCT Filed: Sep. 16, 2015

(86) PCT No.: PCT/JP2015/076235
§ 371 (c)(1),
(2) Date: Mar. 17, 2017

(87) PCT Pub. No.: WO2016/047517
PCT Pub. Date: Mar. 31, 2016

(65) Prior Publication Data
US 2017/0299880 A1    Oct. 19, 2017

(30) Foreign Application Priority Data
Sep. 26, 2014  (JP) .................................. 2014-197115

(51) Int. Cl.
*G02B 27/28* (2006.01)
*G02F 1/1335* (2006.01)
(Continued)

(52) U.S. Cl.
CPC ......... *G02B 27/286* (2013.01); *G02B 5/3083* (2013.01); *G02F 1/13363* (2013.01);
(Continued)

(58) Field of Classification Search
CPC ...... G02B 27/286; G02B 5/3083; G02B 1/08; G02B 5/3016; G02F 1/133528;
(Continued)

(56) References Cited

U.S. PATENT DOCUMENTS 2,367,661 A   1/1945  Agre
2,367,670 A   1/1945  Christ
(Continued)

FOREIGN PATENT DOCUMENTS

CN   101473253 A   7/2009
EP    3199989 A1   8/2017
(Continued)

OTHER PUBLICATIONS

A. Geivandov et al., "Advanced wideband coatable LCD retarder with anomalous dispersion of optical anisotropy", FMC4-3, IDW, pp. 739-742, 2008.*
(Continued)

*Primary Examiner* — Frank G Font
(74) *Attorney, Agent, or Firm* — Kenja IP Law PC

(57) ABSTRACT

A circularly polarizing plate including a polarizing film, a λ/2 plate having a slow axis in a direction forming an angle of 22.5°±10° relative to an absorption axis of the polarizing film, a λ/4 plate having a slow axis in a direction forming an angle of 90°±20° relative to the absorption axis of the polarizing film, in this order, wherein the λ/2 plate and the λ/4 plate have different wavelength dispersions, an NZ factor of the λ/2 plate is 1.00±0.05, and an NZ factor of the λ/4 plate is 0.00±0.05; a method for producing the same, and a method for using the same.

10 Claims, 1 Drawing Sheet

(51) Int. Cl.
*G09G 3/3208* (2016.01)
*H01L 51/50* (2006.01)
*H05B 33/02* (2006.01)
*G02F 1/13363* (2006.01)
*G02B 5/30* (2006.01)

(52) U.S. Cl.
CPC ..... *G02F 1/133528* (2013.01); *G09G 3/3208* (2013.01); *H01L 51/50* (2013.01); *H05B 33/02* (2013.01); *G02F 2001/133541* (2013.01)

(58) Field of Classification Search
CPC ..... G02F 1/13363; G02F 2001/133541; G02F 2001/133635; G02F 2001/133637; G02F 2001/133638; G09G 3/3208; H01L 51/5284
USPC ........ 359/484.05; 349/96, 98, 102, 117–121; 313/112
See application file for complete search history.

(56) References Cited

U.S. PATENT DOCUMENTS

| | | | |
|---|---|---|---|
| 2,448,828 A | 9/1948 | Renfrew | |
| 2,722,512 A | 11/1955 | Crandall | |
| 2,951,758 A | 9/1960 | Notley | |
| 3,046,127 A | 7/1962 | Livingston et al. | |
| 3,549,367 A | 12/1970 | Chang et al. | |
| 4,212,970 A | 7/1980 | Iwasaki | |
| 4,239,850 A | 12/1980 | Kita et al. | |
| 4,619,998 A | 10/1986 | Buhr | |
| 4,696,888 A | 9/1987 | Buhr | |
| 6,400,433 B1 | 6/2002 | Arakawa et al. | |
| 2006/0001799 A1* | 1/2006 | Kawamoto | G02B 5/3016 349/96 |
| 2006/0028601 A1* | 2/2006 | Kawahara | G02B 5/3083 349/117 |
| 2007/0139773 A1* | 6/2007 | Kawamoto | G02B 5/3016 359/487.05 |
| 2007/0165165 A1* | 7/2007 | Joten | G02F 1/133528 349/119 |
| 2008/0291389 A1* | 11/2008 | Kawamoto | G02B 5/3016 349/194 |
| 2009/0002580 A1 | 1/2009 | Matsushima et al. | |
| 2009/0040434 A1* | 2/2009 | Kawamoto | G02B 5/3016 349/96 |
| 2009/0052028 A1 | 2/2009 | Umemoto et al. | |
| 2009/0096970 A1 | 4/2009 | Sakai et al. | |
| 2010/0225855 A1* | 9/2010 | Lu | G02F 1/133555 349/96 |
| 2011/0222155 A1* | 9/2011 | Sakai | G02B 5/3083 359/489.07 |
| 2013/0301129 A1 | 11/2013 | In et al. | |
| 2014/0168769 A1 | 6/2014 | Seo et al. | |
| 2015/0301384 A1* | 10/2015 | Koike | G02F 1/1336 349/65 |
| 2017/0192145 A1 | 7/2017 | Furuki et al. | |

FOREIGN PATENT DOCUMENTS

| | | |
|---|---|---|
| JP | S60105667 A | 6/1985 |
| JP | H05100114 A | 4/1993 |
| JP | H0827284 A | 1/1996 |
| JP | 2000284120 A | 10/2000 |
| JP | 2002311239 A | 10/2002 |
| JP | 2002372622 A | 12/2002 |
| JP | 2006178389 A | 7/2006 |
| JP | 2006268006 A | 10/2006 |
| JP | 2007004120 A | 1/2007 |
| JP | 2008249943 A | 10/2008 |
| JP | 2009110005 A | 5/2009 |
| JP | 2013235272 A | 11/2013 |
| TW | I274913 B | 3/2007 |
| WO | 2012070808 A2 | 5/2012 |
| WO | 2016052360 A1 | 4/2016 |

OTHER PUBLICATIONS

C. Destrade et al., "Disc-Like Mesogens: A Classification", Molecular Crystals and Liquid Crystals, vol. 71, p. 111-135 (1981).
Dec. 15, 2015, International Search Report issued in the International Patent Application No. PCT/JP2015/076235.
J. Zhang et al., "Liquid Crystals Based on Shape-Persistent Macrocyclic Mesogens", J. Am. Chem. Soc., vol. 116, p. 2655 (1994).
The Chemical Society of Japan, "Chemistry of Liquid Crystal", Quarterly Chemical Review, No. 22, Chapter 5 and Section 2 of Chapter 10 (1994).
Mar. 28, 2017, International Preliminary Report on Patentability issued in the International Patent Application No. PCT/JP2015/076235.
May 3, 2018, Extended European Search Report issued by the European Patent Office in the corresponding European Patent Application No. 15844933.0.

* cited by examiner

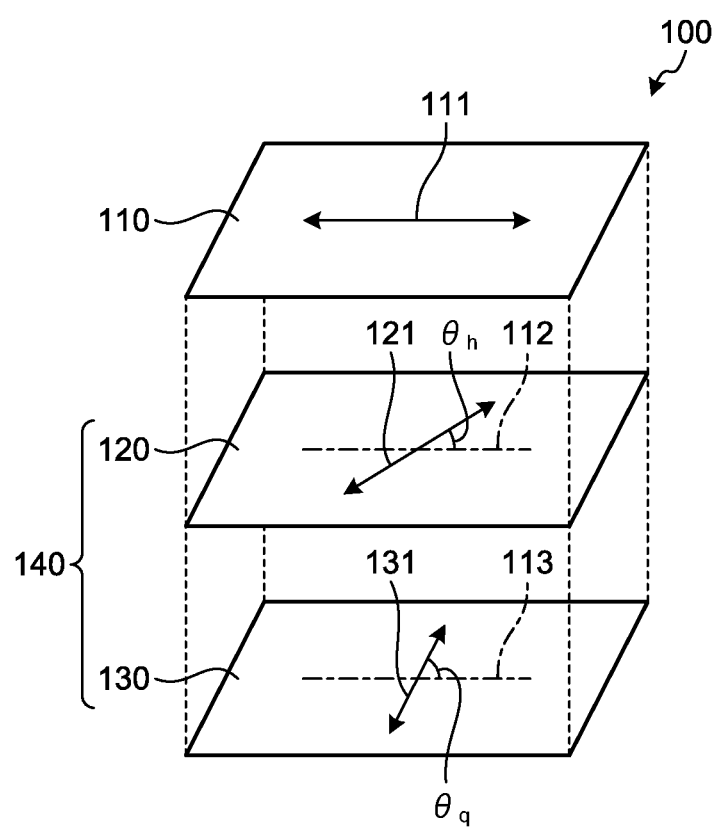

CIRCULARLY POLARIZING PLATE, METHOD FOR PRODUCING SAME, BROADBAND LAMBDA/4 PLATE, ORGANIC ELECTROLUMINESCENT DISPLAY DEVICE, AND LIQUID CRYSTAL DISPLAY DEVICE

FIELD

The present invention relates to a circularly polarizing plate and a production method thereof, as well as a broadband $\lambda/4$ plate, an organic electroluminescent display device, and a liquid crystal display device, provided with the circularly polarizing plate.

BACKGROUND

Conventionally, a circularly polarizing plate has been provided to an organic electroluminescent display device (hereinafter, may be appropriately referred to as an "organic EL display device") and a liquid crystal display device for reducing reflection of outside light on a display surface in some cases. In general, a film obtained by combining a polarizing film and a $\lambda/4$ plate is used as such a circularly polarizing plate. However, most of conventional $\lambda/4$ plates were actually capable of achieving a phase difference of an approximately quarter wavelength only with light in a specific narrow wavelength range. Therefore, although reflection of outside light in a specific narrow wavelength range can be reduced by the circularly polarizing plate, reduction of reflection of other outside light was insufficient.

To deal with this issue, a broadband $\lambda/4$ plate obtained by combining a $\lambda/4$ plate and a $\lambda/2$ plate has been recently proposed (see Patent Literatures 1 to 4). With the broadband $\lambda/4$ plate, a phase difference of an approximately quarter wavelength for light in a wide wavelength range can be achieved. Therefore, a circularly polarizing plate that can reduce reflection of outside light in a wide wavelength range can be achieved.

CITATION LIST

Patent Literature

Patent Literature 1: Japanese Patent Application Laid-Open No. Hei. 05-100114 A

Patent Literature 2: Japanese Patent Application Laid-Open No. 2007-004120 A (foreign counterpart application: specification of U.S. Patent Application Publication No. 2009/052028)

Patent Literature 3: Japanese Patent Application Laid-Open No. 2013-235272 A (foreign counterpart application: specification of U.S. Patent Application Publication No. 2013/301129)

Patent Literature 4: Japanese Patent Application Laid-Open No. 2000-284120 A (foreign counterpart application: specification of U.S. Pat. No. 6,400,433)

SUMMARY

Technical Problem

In a circularly polarizing plate obtained by combining a polarizing film and the broadband $\lambda/4$ plate, directions of optical axes including an absorption axis of the polarizing film, a slow axis of a $\lambda/2$ plate, and a slow axis of a $\lambda/4$ plate are required to be adjusted such that these optical axes form specific angles.

However, when the circularly polarizing plate is observed from a tilt direction other than a front direction, apparent angles formed by the above-mentioned optical axes may deviate from the specific angles in some cases. As a result, while a conventional circularly polarizing plate is capable of reducing reflection of outside light in a front direction, it may be incapable of effectively reducing reflection of outside light in a tilt direction other than the front direction in some cases. In particular, since the circularly polarizing plate including the broadband $\lambda/4$ plate includes not only the $\lambda/4$ plate but also the $\lambda/2$ plate, the number of optical axes is larger than that of a conventional circularly polarizing plate. Therefore, in the circularly polarizing plate including the broadband $\lambda/4$ plate, the deviation of apparent optical axes is larger than that of a conventional circularly polarizing plate which does not include the $\lambda/2$ plate, and the ability to reduce reflection of outside light in a tilt direction tends to be deteriorated.

The present invention has been created in view of the above-described problems, and it is an object of the present invention to provide: a circularly polarizing plate that can effectively reduce reflection of outside light in both a front direction and a tilt direction; a broadband $\lambda/4$ plate capable of achieving the circularly polarizing plate that can effectively reduce reflection of outside light in both a front direction and a tilt direction; and an organic electroluminescent display device and a liquid crystal display device including the above-described circularly polarizing plate.

Solution to Problem

The present inventor intensively conducted research for solving the above-mentioned problems. As a result, the present inventor has found that a circularly polarizing plate that can effectively reduce reflection of outside light in both a front direction and a tilt direction can be provided when a combination of the following (1) to (3) is applied to a circularly polarizing film including a polarizing film, a $\lambda/2$ plate, and a $\lambda/4$ in this order.

(1) The angle formed by the absorption axis of the polarizing film and the absorption axis of the $\lambda/2$ plate is confined within a specific range, and the angle formed by the absorption axis of the polarizing film and the absorption axis of the $\lambda/4$ plate is confined within a specific angle.

(2) The wavelength dispersion of the $\lambda/2$ plate and the wavelength dispersion of the $\lambda/4$ plate are made different from each other.

(3) The $\lambda/2$ plate and the $\lambda/4$ plate are made optically uniaxial.

The present invention has been achieved on the basis of such findings.

That is, the present invention is as follows.

(1) A circularly polarizing plate comprising:
a polarizing film;
a $\lambda/2$ plate having a slow axis in a direction forming an angle of 22.5°±10° relative to an absorption axis of the polarizing film;
a $\lambda/4$ plate having a slow axis in a direction forming an angle of 90°±20° relative to the absorption axis of the polarizing film, in this order, wherein
the $\lambda/2$ plate and the $\lambda/4$ plate have different wavelength dispersions,
an NZ factor of the $\lambda/2$ plate is 1.00±0.05, and
an NZ factor of the $\lambda/4$ plate is 0.00±0.05.

(2) The circularly polarizing plate according to (1), satisfying the following formula (A):

Reh(400)/Reh(550)<Req(400)/Req(550)

wherein Reh(400) is an in-plane phase difference of the λ/2 plate at a wavelength of 400 nm,
Reh(550) is an in-plane phase difference of the λ/2 plate at a wavelength of 550 nm,
Req(400) is an in-plane phase difference of the λ/4 plate at a wavelength of 400 nm, and
Req(550) is an in-plane phase difference of the λ/4 plate at a wavelength of 550 nm.

(3) The long-length circularly polarizing plate according to (1) or (2), satisfying the following formula (B):

Req(400)/Req(550)−Reh(400)/Reh(550)=0.12±0.08 wherein Reh(400) is an in-plane phase difference of the λ/2 plate at a wavelength of 400 nm,
Reh(550) is an in-plane phase difference of the λ/2 plate at a wavelength of 550 nm,
Req(400) is an in-plane phase difference of the λ/4 plate at a wavelength of 400 nm, and
Req(550) is an in-plane phase difference of the λ/4 plate at a wavelength of 550 nm.

(4) The circularly polarizing plate according to (1) to (3), wherein the λ/4 plate includes a layer formed of a material having a negative intrinsic birefringence value.

(5) The circularly polarizing plate according to any one of (1) to (4), wherein the λ/2 plate includes a layer formed of a material having a positive intrinsic birefringence value.

(6) A broadband λ/4 plate comprising:
a λ/2 plate having a slow axis in a direction forming an angle of 22.5°±10° relative to a reference direction; and
a λ/4 plate having a slow axis in a direction forming an angle of 90°±20° relative to the reference direction, wherein
the λ/2 plate and the λ/4 plate have different wavelength dispersions,
an NZ factor of the λ/2 plate is 1.00±0.05, and
an NZ factor of the λ/4 plate is 0.00±0.05.

(7) An organic electroluminescent display device comprising the circularly polarizing plate according to any one of (1) to (5).

(8) A liquid crystal display device comprising the circularly polarizing plate according to any one of (1) to (5).

(9) A method for producing a circularly polarizing plate, comprising the steps of:
stretching a first pre-stretch film including a layer formed of a material having a positive intrinsic birefringence value in one direction to obtain a λ/2 plate having a slow axis in a stretching direction;
stretching a second pre-stretch film including a layer formed of a material having a negative intrinsic birefringence value in one direction to obtain a λ/4 plate having a slow axis in a direction perpendicular to a stretching direction;
bonding a polarizing film and the λ/2 plate together such that a slow axis of the λ/2 plate forms an angle of 22.5°±10° relative to an absorption axis of the polarizing film; and
bonding the λ/2 plate and the λ/4 plate together such that a slow axis of the λ/4 plate forms an angle of 90°±20° relative to the absorption axis of the polarizing film, wherein
the λ/2 plate and the λ/4 plate have different wavelength dispersions,
an NZ factor of the λ/2 plate is 1.00±0.05, and
an NZ factor of the λ/4 plate is 0.00±0.05.

(10) A method for producing a circularly polarizing plate, comprising the steps of:
stretching a first pre-stretch film including a layer formed of a material having a positive intrinsic birefringence value in one direction to obtain a λ/2 plate having a slow axis in a stretching direction;
forming a layer containing a discotic liquid crystalline molecule on a supporting body, orienting the discotic liquid crystalline molecule, and fixing the discotic liquid crystalline molecule to obtain a λ/4 plate;
bonding a polarizing film and the λ/2 plate together such that a slow axis of the λ/2 plate forms an angle of 22.5°±10° relative to an absorption axis of the polarizing film; and
bonding the λ/2 plate and the λ/4 plate together such that a slow axis of the λ/4 plate forms an angle of 90°±20° relative to the absorption axis of the polarizing film, wherein
the λ/2 plate and the λ/4 plate have different wavelength dispersions,
an NZ factor of the λ/2 plate is 1.00±0.05, and
an NZ factor of the λ/4 plate is 0.00±0.05.

Advantageous Effects of Invention

According to the present invention, there can be provided a circularly polarizing plate that can effectively reduce reflection of outside light in both a front direction and a tilt direction; a broadband λ/4 plate capable of achieving the circularly polarizing plate that can effectively reduce reflection of outside light in both a front direction and a tilt direction; and an organic electroluminescent display device and a liquid crystal display device including the above-described circularly polarizing plate.

BRIEF DESCRIPTION OF DRAWINGS

FIG. 1 is an exploded perspective view of a circularly polarizing plate according to an embodiment of the present invention.

DESCRIPTION OF EMBODIMENTS

Hereinafter, the present invention will be described in detail by illustrating embodiments and examples. However, the present invention is not limited to the following embodiments and examples, which can be freely modified and implemented within the scope not departing from the claims of the present invention and equivalents thereto.

In the following description, a "long-length" film refers to a film having a length of five times or more, and preferably ten times or more the film width. Specifically, the term refers to a long-length film having a length to be wound up into a roll shape for storage or transportation.

In the following description, an in-plane phase difference Re of a film is a value represented by Re=(nx−ny)×d, unless otherwise stated. A thickness-direction phase difference Rth of a film is a value represented by Rth={(nx+ny)/2−nz}×d, unless otherwise stated. Furthermore, an NZ factor of a film is a value represented by (nx−nz)/(nx−ny), unless otherwise stated. Here, nx represents a refractive index in a direction in which the maximum refractive index is given among directions perpendicular to a thickness direction of the film (in-plane directions), ny represents a refractive index in one of the above-mentioned in-plane directions that is orthogonal to the nx direction, and nz represents a refractive index in a thickness direction of the film. d represents a thickness of a film. The measurement wavelength is 590 nm unless otherwise stated.

In the following description, a positive intrinsic birefringence value means that the refractive index in a stretching direction is larger than the refractive index in a direction orthogonal to the stretching direction, unless otherwise stated. A negative intrinsic birefringence value means that the refractive index in a stretching direction is smaller than the refractive index in a direction orthogonal to the stretching direction, unless otherwise stated. The value of the intrinsic birefringence value may be calculated from a dielectric constant distribution.

In the following description, "(meth)acryl-" includes both "acryl-" and "methacryl-".

In the following description, a diagonal direction of a long-length film refers to a direction which is the in-plane direction of the film and neither parallel to nor perpendicular to the width direction of the film, unless otherwise stated.

In the following description, a front direction of a film means the normal line direction of the main surface of the film, unless otherwise stated. Specifically, it indicates a direction in which the polar angle of the main surface is 0° and the azimuth angle of the main surface is 0°.

In the following description, a tilt direction of a film means a direction which is neither parallel to nor perpendicular to the main surface of the film, unless otherwise stated. Specifically, it indicates a direction in which the polar angle of the main surface falls within the range of larger than 0° and smaller than 90°.

In the following description, "parallel", "perpendicular" and "orthogonal", which are directions of an element, may contain an error within the range in which the effects of the present invention are not impaired, for example, in the range of ±5°, unless otherwise stated.

In the following description, a lengthwise direction of a long-length film is usually parallel to a direction of flow of a film in a production line.

In the following description, a "polarizing plate", a "λ/2 plate", and a "λ/4 plate" each include not only a rigid member, but also a flexible member such as a resin film, unless otherwise stated.

In the following description, angles formed by optical axes (an absorption axis, a slow axis, and the like) of a plurality of films included in a member indicate angles when the films are observed from a thickness direction, unless otherwise stated.

In the following description, a slow axis of a film represents an in-plane slow axis of the film, unless otherwise stated.

1. Layer Configuration of Circularly Polarizing Plate

FIG. 1 is an exploded perspective view of a circularly polarizing plate according to an embodiment of the present invention. In FIG. 1, an axis 112 as a projected line of an absorption axis 111 of a polarizing film 110 is indicated with a dot-and-dash line on the surface of a λ/2 plate 120. In FIG. 1, an axis 113 as a projected line of the absorption axis 111 of the polarizing film 110 is indicated with a dot-and-dash line on the surface of a λ/4 plate 130.

As illustrated in FIG. 1, a circularly polarizing plate 100 according to an embodiment of the present invention includes the polarizing film 110, the λ/2 plate 120, and the λ/4 plate 130 in this order in the thickness direction of the circularly polarizing plate 100.

The polarizing film 110 is a polarizing plate having the absorption axis 111. The polarizing film 110 has the function of absorbing linearly polarized light having a vibration direction parallel to the absorption axis 111, and permitting transmission of polarized light other than this linearly polarized light. Here, the vibration direction of linearly polarized light means the vibration direction of the electric field of the linearly polarized light.

The λ/2 plate 120 is an optical member having a specific phase difference. This λ/2 plate 120 has a slow axis 121, which is parallel to the in-plane direction of the λ/2 plate 120, in the direction forming a specific angle θh with respect to the absorption axis 111 of the polarizing film 110.

The λ/4 plate 130 is an optical member having a specific phase difference which is different from that of the λ/2 plate 120. This λ/4 plate 130 has a slow axis 131 parallel to the in-plane direction of the λ/4 plate 130, in the direction forming a specific angle θq with respect to the absorption axis 111 of the polarizing film 110.

In the circularly polarizing plate 100 having such a structure, a layer portion including the λ/2 plate 120 and the λ/4 plate 130 becomes a broadband λ/4 plate 140. The broadband λ/4 plate 140 is capable of imparting, to light which passes through the layer portion, an in-plane phase difference of approximately a quarter wavelength of the light in a wide wavelength range. Therefore, the circularly polarizing plate 100 can function as a circularly polarizing plate which can absorb one of right-handed circularly polarized light and left-handed circularly polarized light and permit transmission of the remaining light in a wide wavelength range.

The circularly polarizing plate 100 may be a sheet piece film, but is preferably a long-length film in terms of efficient production. When the circularly polarizing plate 100 is a long-length film, the absorption axis 111 of the polarizing film 110 is usually parallel to the lengthwise direction of the circularly polarizing plate 100.

2. Polarizing Film

The polarizing film usually includes a polarizer layer, and if necessary, a protective film layer for protecting the polarizer layer.

The polarizer layer may be obtained by, for example, performing an appropriate treatment such as a dyeing treatment with a dichroic material such as iodine and a dichroic dye, a stretching treatment, and a crosslinking treatment, in an appropriate order with appropriate style, to a film of an appropriate vinyl alcohol-based polymer such as polyvinyl alcohol and partially formalized polyvinyl alcohol. In the stretching treatment for producing the polarizer layer, a long-length film before stretching is usually stretched in a lengthwise direction. Therefore, an absorption axis parallel to the lengthwise direction of the polarizer layer may be expressed in the obtained polarizer layer. This polarizer layer is capable of absorbing linearly polarized light having a vibration direction parallel to the absorption axis. In particular, the polarizer layer having an excellent polarization is preferable. The thickness of the polarizer layer is, but not limited to, generally 5 μm to 80 μm.

As the protective film layer for protecting the polarizer layer, any transparent film may be used. In particular, a film of a resin which is excellent in transparency, mechanical strength, heat stability, moisture-blocking properties, and the like is preferable. Examples of such a resin may include acetate resin such as triacetyl cellulose, polyester resin, polyether sulfone resin, polycarbonate resin, polyamide resin, polyimide resin, polyolefin resin, cyclic olefin resin, and (meth)acrylic resin. Of these, acetate resin, cyclic olefin resin, and (meth)acrylic resin are preferable in terms of small birefringence, and cyclic olefin resin is particularly preferable from the viewpoint of transparency, low hygroscopicity, size stability, lightweight property, and the like.

The polarizing film may be either a sheet piece polarizing film or a long-length polarizing film in accordance with the shape of the circularly polarizing plate.

The polarizing film may be produced by, for example, bonding the polarizer layer and the protective film layer. An adhesive may be used if necessary for the bonding. In particular when the polarizing film is produced as a long-length film, the polarizing film can be produced by bonding a long-length polarizer layer and a long-length protective film layer by a roll-to-roll method with their lengthwise directions being parallel to each other. As a result, production efficiency can be enhanced.

Furthermore, when the sheet piece polarizing film is produced, a sheet piece polarizing film may be produced by cutting the long-length polarizing film into a specific shape.

3. λ/2 Plate

The λ/2 plate is an optical member having an in-plane phase difference of usually 240 nm or more and usually 300 nm or less at a measurement wavelength of 590 nm. Since the λ/2 plate has such an in-plane phase difference, the broadband λ/4 plate can be achieved by combining the λ/2 plate and the λ/4 plate. Therefore, the circularly polarizing plate according to the present invention can express the function of absorbing one of right-handed circularly polarized light and left-handed circularly polarized light and permitting transmission of the remaining light in a wide wavelength range. In this manner, the circularly polarizing plate of the present invention can reduce reflection of light in a wide wavelength range in both a front direction and a tilt direction. In particular, for effectively reducing the reflection of outside light particularly in a tilt direction, the in-plane phase difference in the λ/2 plate at a measurement wavelength of 590 nm is preferably 250 nm or more, and is preferably 280 nm or less, and more preferably 265 nm or less.

The NZ factor (NZh) for the λ/2 plate is generally 1.00±0.05. The NZ factor (NZh) of approximately 1.0 possessed by the λ/2 plate means that the λ/2 plate has optical uniaxiality. When the λ/2 plate has such optical uniaxiality, the circularly polarizing plate of the present invention can effectively reduce reflection of outside light in a tilt direction.

The λ/2 plate has its slow axis in the direction forming a specific angle θh with respect to the absorption axis of the polarizing film. Regarding this feature, the range of the above-mentioned angle θh is usually 22.5°±10°. When the angle θh formed by the slow axis of the λ/2 plate with respect to the absorption axis of the polarizing film is confined within the above-mentioned range, the combination of the λ/2 plate and the λ/4 plate can achieve the broadband λ/4 plate. Therefore, the circularly polarizing plate of the present invention can reduce reflection of light in a wide wavelength range in both a front direction and a tilt direction. The angle θh formed by the slow axis of the λ/2 plate with respect to the absorption axis of the polarizing film is preferably 22.5°±7.5°, and more preferably 22.5°±4.5°. Accordingly, the circularly polarizing plate of the present invention can effectively reduce reflection of outside light effectively particularly in a tilt direction.

As the λ/2 plate having the optical characteristics described above, a resin film is usually used. Such a resin is preferably a thermoplastic resin. Further, the λ/2 plate may be a resin film of single layer structure having only one layer, and may also be a resin film of multilayer structure having two or more layers.

Of these, the λ/2 plate preferably includes a layer that is formed of a material having a positive intrinsic birefringence value for easy production. As the material having a positive intrinsic birefringence value, a resin having a positive intrinsic birefringence value is usually used. The resin having a positive intrinsic birefringence value contains a polymer having a positive intrinsic birefringence value. Examples of such a polymer may include polyolefins such as polyethylene and polypropylene; polyesters such as polyethylene terephthalate and polybutylene terephthalate; polyarylene sulfides such as polyphenylene sulfide; polyvinyl alcohol; polycarbonate; polyarylate; cellulose ester polymers, polyethersulfone; polysulfone; polyallyl sulfone; polyvinyl chloride; cyclic olefin polymers such as a norbornene polymer; and rod-like liquid crystal polymers. One type of these polymers may be used alone, and two or more types thereof may also be used in combination at any ratio. Further, the polymer may be a homopolymer, and may also be a copolymer. Of these, a polycarbonate polymer is preferable since it is excellent in phase difference expression and stretchability at a low temperature, and a cyclic olefin polymer is preferable since it is excellent in mechanical characteristics, heat resistance, transparency, low hygroscopicity, size stability, and lightweight property.

As the polycarbonate polymer, any polymer having a structural unit including a carbonate bond (—O—C(=O)—O—) may be used. Examples of the polycarbonate polymer may include bisphenol-A polycarbonate, branched bisphenol-A polycarbonate, and o,o,o',o'-tetramethylbisphenol-A polycarbonate.

The cyclic olefin polymer refers to a polymer having a structural unit that has an alicyclic structure. The cyclic olefin polymer may be a polymer having an alicyclic structure in a main chain, a polymer having an alicyclic structure in a side chain, a polymer having alicyclic structures in main and side chains, and a mixture of two or more of these polymers at any ratio. Of these, a polymer having an alicyclic structure in a main chain is preferable from the viewpoint of mechanical strength and heat resistance.

Examples of the alicyclic structure may include a saturated alicyclic hydrocarbon (cycloalkane) structure and an unsaturated alicyclic hydrocarbon (cycloalkene and cycloalkyne) structure. Of these, a cycloalkane structure and a cycloalkene structure are preferable from the viewpoint of mechanical strength and heat resistance. Of these, a cycloalkane structure is particularly preferable.

The number of carbon atoms constituting the alicyclic structure is preferably 4 or more, and more preferably 5 or more, and is preferably 30 or less, more preferably 20 or less, and particularly preferably 15 or less, per alicyclic structure. When the number of carbon atoms constituting the alicyclic structure falls within this range, mechanical strength, heat resistance, and moldability of the λ/2 plate are highly balanced.

In the cyclic olefin polymer, the ratio of the structural unit having the alicyclic structure is preferably 55% by weight or more, further preferably 70% by weight or more, and particularly preferably 90% by weight or more. When the ratio of the structural unit having the alicyclic structure in the cyclic olefin polymer falls within this range, transparency and heat resistance of the λ/2 plate become favorable.

Of the cyclic olefin polymers, a cycloolefin polymer is preferable. The cycloolefin polymer is a polymer having a structure obtained by polymerizing a cycloolefin monomer.

Further, the cycloolefin monomer is a compound having a ring structure formed of carbon atoms and also having a polymerizable carbon-carbon double bond in the ring structure. Examples of the polymerizable carbon-carbon double bond may include a carbon-carbon double bond that is capable of being polymerized in such a manner as a ring opening polymerization. Further, examples of the ring structure of the cycloolefin monomer may include monocyclic, polycyclic, fused polycyclic, and cross-linked cyclic structures, and polycyclic structures that are combinations of the aforementioned structures. Of these, the polycyclic cycloolefin monomer is preferable from the viewpoint of highly balancing characteristics such as dielectric property and heat resistance.

Preferable examples of the cycloolefin polymers described above may include a norbornene-based polymer, a monocyclic olefin-based polymer, a cyclic conjugated diene-based polymer, and hydrogenated products thereof. Of these, the norbornene-based polymer is particularly preferable because of its favorable moldability.

Examples of the norbornene-based polymer may include a ring-opening polymer of a monomer having a norbornene structure and a hydrogenated product thereof; and an addition polymer of a monomer having a norbornene structure and a hydrogenated product thereof. Further, examples of the ring-opening polymer of a monomer having a norbornene structure may include a ring-opening homopolymer of one type of a monomer having a norbornene structure, a ring-opening copolymer of two or more types of monomers having norbornene structures, and a ring-opening copolymer of a monomer having a norbornene structure and another monomer copolymerizable therewith. Further, examples of the addition polymer of a monomer having a norbornene structure may include an addition homopolymer of one type of a monomer having a norbornene structure, an addition copolymer of two or more types of monomers having norbornene structures, and an addition copolymer of a monomer having a norbornene structure and another monomer copolymerizable therewith. Of these, a hydrogenated product of the ring-opening polymer of a monomer having a norbornene structure is particularly preferable from the viewpoint of moldability, heat resistance, low hygroscopicity, size stability, lightweight property, and the like.

Examples of the monomer having a norbornene structure may include bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$] deca-3-ene (common name: methanotetrahydrofluorene), tetracyclo[4.4.0.1$^{2,5}$.1$^{7,10}$]dodeca-3-ene (common name: tetracyclododecene), and derivatives of these compounds (for example, those having a substituent on the ring). Examples of the substituent herein may include an alkyl group, an alkylene group, and a polar group. Further, a plurality of such substituents may be bonded to the ring and these structures may be the same or different from each other. As the monomer having a norbornene structure, one type thereof may be used alone, and two or more types thereof may also be used in combination at any ratio.

Examples of the polar group may include a hetero atom and an atomic group having a hetero atom. Examples of the hetero atom may include an oxygen atom, a nitrogen atom, a sulfur atom, a silicon atom, and a halogen atom. Specific examples of the polar group may include a carboxyl group, a carbonyloxycarbonyl group, an epoxy group, a hydroxyl group, an oxy group, an ester group, a silanol group, a silyl group, an amino group, an amide group, an imide group, a nitrile group, and a sulfonic acid group.

Examples of the monomer copolymerizable with the monomer having a norbornene structure through ring opening polymerization may include monocyclic olefins such as cyclohexene, cycloheptene, and cyclooctene, and derivatives thereof; and cyclic conjugated dienes such as cyclohexadiene and cycloheptadiene, and derivatives thereof. As the monomer copolymerizable with the monomer having a norbornene structure through ring opening polymerization, one type thereof may be used alone, and two or more types thereof may also be used in combination at any ratio.

The ring-opening polymer of a monomer having a norbornene structure may be produced, for example, by polymerizing or copolymerizing such monomers in the presence of a ring opening polymerization catalyst.

Examples of the monomer addition-copolymerizable with the monomer having a norbornene structure may include α-olefins having 2 to 20 carbon atoms such as ethylene, propylene, and 1-butene, and derivatives thereof; cycloolefins such as cyclobutene, cyclopentene, and cyclohexene, and derivatives thereof; and non-conjugated dienes such as 1,4-hexadiene, 4-methyl-1,4-hexadiene, and 5-methyl-1,4-hexadiene. Of these, the α-olefins are preferable, and ethylene is more preferable. Further, as the monomer addition-copolymerizable with the monomer having a norbornene structure, one type thereof may be used alone, and two or more types thereof may also be used in combination at any ratio.

The addition polymer of a monomer having a norbornene structure may be produced, for example, by polymerizing or copolymerizing such monomers in the presence of an addition polymerization catalyst.

A hydrogenated product of the ring-opening polymer and a hydrogenated product of the addition polymer described above may be produced, for example, by hydrogenating a carbon-carbon unsaturated bond preferably by 90% or more in a solution of the ring-opening polymer and the addition polymer in the presence of a hydrogenation catalyst containing transition metal such as nickel and palladium.

As the norbornene-based polymer, it is preferable that the polymer has an X: bicyclo [3.3.0] octane-2,4-diyl-ethylene structure and a Y: tricyclo [4.3.0.1$^{2,5}$] decane-7,9-diyl-ethylene structure as the structural units, and that the amount of these structural units is 90% by weight or more with respect to the entire structural units of the norbornene-based polymer, and the weight ratio of X and Y is 100:0 to 40:60. By using such a polymer, the λ/2 plate containing the norbornene-based polymer can exhibit excellent stability in optical characteristics without having a size change over a long period of time.

Examples of the monocyclic olefin-based polymer may include: an addition polymer of a monocyclic olefin-based monomer, such as cyclohexene, cycloheptene, and cyclooctene.

Examples of the cyclic conjugated diene-based polymer may include: a polymer obtained by the cyclization reaction of an addition polymer of a conjugated diene-based monomer such as 1,3-butadiene, isoprene, and chloroprene; a 1,2- or 1,4-addition polymer of a cyclic conjugated diene-based monomer such as cyclopentadiene and cyclohexadiene; and hydrogenated products thereof.

The weight average molecular weight (Mw) of the polymer contained in the resin having a positive intrinsic birefringence value is preferably 10,000 or more, more preferably 15,000 or more, and particularly preferably 20,000 or more, and is preferably 100,000 or less, more preferably 80,000 or less, and particularly preferably 50,000 or less. When the weight average molecular weight is in such a range, mechanical strength and moldability of the λ/2 plate preferably are highly balanced, thus being preferable. Herein, the above-mentioned weight average molecular weight is measured in terms of polyisoprene or polystyrene by a gel permeation chromatography using cyclohexane as a solvent (when the sample does not dissolve in cyclohexane, toluene may be used as the solvent).

The molecular weight distribution (weight average molecular weight (Mw)/number average molecular weight (Mn)) of the polymer contained in the resin having a positive intrinsic birefringence value is preferably 1.2 or more, more preferably 1.5 or more, and particularly preferably 1.8 or more, and is preferably 3.5 or less, more preferably 3.0 or less, and particularly preferably 2.7 or less. When the molecular weight distribution is equal to or higher than the lower limit value of the above-mentioned range, it becomes possible to increase the productivity of the polymer and reduce a production cost. Further, when it is equal to or lower than the upper limit value, the amount of low molecular components is reduced, whereby it is possible to suppress relaxation of the film which may be caused by high-temperature exposure, and the stability of the λ/2 plate can thus be improved.

The ratio of the polymer in the resin having a positive intrinsic birefringence value is preferably 50% by weight to 100% by weight, more preferably 70% by weight to 100% by weight, and particularly preferably 90% by weight to 100% by weight. When the ratio of the polymer falls within the above-mentioned range, the λ/2 plate can exhibit sufficient heat resistance and transparency.

The resin having a positive intrinsic birefringence value may contain an additive in addition to the above-mentioned polymer. Examples of the additive may include: a coloring agent such as a pigment and a dye; a plasticizer; a fluorescent brightening agent; a dispersant; a thermostabilizer; a light stabilizer; a ultraviolet absorbing agent; an antistatic agent; an antioxidant; a microparticle; and a surfactant. One type of these components may be used alone, and two or more types thereof may also be used in combination at any ratio.

The glass transition temperature Tg of the resin having a positive intrinsic birefringence value is preferably 100° C. or higher, more preferably 110° C. or higher, and particularly preferably 120° C. or higher, and is preferably 190° C. or lower, more preferably 180° C. or lower, and particularly preferably 170° C. or lower. When the glass transition temperature of the resin having a positive intrinsic birefringence value is equal to or higher than the above-mentioned lower limit value of the range, the λ/2 plate can have enhanced durability under a high temperature environment. When the glass transition temperature is equal to or lower than the upper limit value, a stretching process can be easily performed.

The absolute value of photoelastic coefficient of the resin having a positive intrinsic birefringence value is preferably $10 \times 10^{-12}$ $Pa^{-1}$ or less, more preferably $7 \times 10^{-12}$ $Pa^{-1}$ or less, and particularly preferably $4 \times 10^{-12}$ $Pa^{-1}$ or less. When the absolute value is set within this range, fluctuations of in-plane phase difference of the λ/2 plate can be reduced. The photoelastic coefficient C is a value represented by $C = \Delta n / \sigma$, where $\Delta n$ is a birefringence and $\sigma$ is a stress.

When the λ/2 plate is a resin film made of a thermoplastic resin as described above, the λ/2 plate may be produced by preparing a first pre-stretch film made of a thermoplastic resin and stretching the first pre-stretch film so as to express a desired phase difference. For example, when the λ/2 plate includes a layer formed of a resin having a positive intrinsic birefringence value, the λ/2 plate is preferably produced by a production method including: a first step (a) of preparing a first pre-stretch film including a layer formed of a resin having a positive intrinsic birefringence value; and a second step (b) of stretching the first pre-stretch film thus prepared in one direction to obtain the λ/2 plate having a slow axis in the stretching direction.

In the first step (a), the first pre-stretch film including a layer formed of a resin having a positive intrinsic birefringence value is prepared. The first pre-stretch film may be produced by a melt molding method or a solution casting method, and the melt molding method is preferable. As the melt molding method, an extrusion molding method, an inflation molding method, or a press molding method is preferable, and the extrusion molding method is particularly preferable.

The first pre-stretch film is usually obtained as a long-length resin film. By preparing the first pre-stretch film as a long-length resin film, upon production of the λ/2 plate, a part or all of production steps can be performed by in-line process so that the production can be performed simply and efficiently.

After the first pre-stretch film is prepared in the first step (a), the second step (b) of stretching the first pre-stretch film is performed. The stretching in the second step (b) usually expresses a desired phase difference in the layer formed of a resin having a positive intrinsic birefringence value, and thus the λ/2 plate is obtained as a stretched film. The obtained λ/2 plate usually has a slow axis in a stretching direction.

In the second step (b), any appropriate stretching method may be employed in accordance with optical characteristics desired to be expressed by stretching. Examples of the stretching method may include: a method in which uniaxial stretching is performed in a lengthwise direction by utilizing a difference in circumferential speeds between rolls (lengthwise uniaxial stretching); a method in which uniaxial stretching is performed in the width direction using a tenter stretching machine (horizontal uniaxial stretching); and a method in which a film is stretched in a diagonal direction (diagonal stretching). The stretching may be performed once or two or more times.

In the second step (b), uniaxial stretching in which the film is stretched only in one direction is performed to improve uniaxiality of the layer formed of a resin having a positive intrinsic birefringence value. In general, in the λ/2 plate obtained by stretching a resin having a positive intrinsic birefringence value, the NZ factor (NZh) tends to approach 1.0 when the uniaxiality is higher. When the λ/2 plate has high uniaxiality, the NZ factor (NZh) can be made close to 1.0. Therefore, a circularly polarizing plate provided with the λ/2 plate can reduce reflection of outside light in a tilt direction more effectively.

When the first pre-stretch film is stretched only in one direction, the stretching may be performed in any direction. In particular, when the first pre-stretch film is a long-length film, the first pre-stretch film is preferably stretched in a lengthwise direction of the first pre-stretch film. This allows free uniaxial stretching. The free uniaxial stretching herein means that a film is stretched in one direction without applying a restraining force to other directions than the stretching direction. Such a stretching in the lengthwise direction may be performed, for example, by a roller stretching machine while the first pre-stretch film is continuously conveyed in its lengthwise direction.

The stretching ratio in the second step (b) is preferably 1.1 times or more, more preferably 1.3 times or more, and particularly preferably 1.5 times or more, and is preferably 4 times or less, more preferably 3 times or less, and particularly preferably 2.5 times or less. When the stretching ratio in the second step (b) is confined within the above-mentioned range, the λ/2 plate having desired optical characteristics can be easily obtained.

The stretching temperature in the second step (b) is preferably Tg° C. or higher, more preferably (Tg+2° C.) or higher, and particularly preferably (Tg+5° C.) or higher, and is preferably (Tg+40° C.) or lower, more preferably (Tg+35° C.) or lower, and particularly preferably (Tg+30° C.) or lower. Herein, Tg represents a glass transition temperature of the resin having a positive intrinsic birefringence value. When the stretching temperature in the second step (b) falls within the above-mentioned range, molecules contained in the first pre-stretch film can be reliably oriented, and thus, the λ/2 plate having desired optical characteristics can be easily obtained.

Further, the method for producing the λ/2 plate described above may also include an optional step in addition to the steps described above.

For example, when the long-length λ/2 plate is produced using the long-length first pre-stretch film, a trimming step for cutting the λ/2 plate into a desired shape may be performed. By performing the trimming step, a sheet piece of a λ/2 plate having a desired shape can be obtained.

Further, for example, a step of providing a protective layer on the λ/2 plate may be performed.

The total light transmittance of the λ/2 plate is preferably 80% or more. The light transmittance may be measured using a spectrophotometer (ultraviolet visible near-infrared spectrophotometer "V-570" manufactured by Jasco Corporation) in accordance with JIS K0115.

The haze of the λ/2 plate is preferably 5% or less, more preferably 3% or less, particularly preferably 1% or less, and ideally 0%. Here, the haze may be an average value calculated from measurements at five points using a "turbidimeter NDH-300A" manufactured by Nippon Denshoku Industries Co., Ltd in accordance with JIS K7361-1997.

The amount of a volatile component contained in the λ/2 plate is preferably 0.1% by weight or less, more preferably 0.05% by weight or less, further preferably 0.02% by weight or less, and ideally zero. By reducing the amount of the volatile component, size stability of the λ/2 plate can be improved and changes with the lapse of time in optical characteristics such as a phase difference can be reduced.

The volatile component herein is a substance having a molecular weight of 200 or less contained at a minute amount in the film, and examples thereof may include a residual monomer and a solvent. The amount of the volatile component may be quantitatively determined, as the total of substances having a molecular weight of 200 or less contained in the film, by dissolving the film in chloroform and analyzing a dissolved matter using a gas chromatography.

The saturated water absorption rate of the λ/2 plate is preferably 0.03% by weight or less, further preferably 0.02% by weight or less, particularly preferably 0.01% by weight or less, and ideally zero. When the saturated water absorption rate of the λ/2 plate falls within the above-mentioned range, changes with the lapse of time in optical characteristics such as an in-plane phase difference can be reduced.

The saturated water absorption rate is a value represented by the percentage of an increase in a weight of a film test piece after immersion in water at 23° C. for 24 hours with respect to the weight of the film test piece before immersion.

The thickness of the λ/2 plate is preferably 10 μm or more, more preferably 15 μm or more, and further preferably 30 μm or more, and is preferably 100 μm or less, more preferably 80 μm or less, and further preferably 60 μm or less. Accordingly, the mechanical strength of the λ/2 plate can be enhanced.

4. λ/4 Plate

The λ/4 plate is an optical member having an in-plane phase difference of usually 110 nm or more and usually 154 nm or less at a measurement wavelength of 590 nm. Since the λ/4 plate has such an in-plane phase difference, the broadband λ/4 plate can be achieved by combining the λ/2 plate and the λ/4 plate. Therefore, the circularly polarizing plate according to the present invention can express the function of absorbing one of right-handed circularly polarized light and left-handed circularly polarized light and permitting transmission of the remaining light in a wide wavelength range. Accordingly, the circularly polarizing plate of the present invention can reduce reflection of light in a wide wavelength range in both a front direction and a tilt direction. In particular, for effectively reducing reflection of outside light particularly in a tilt direction, the in-plane phase difference of the λ/4 plate at a measurement wavelength of 590 nm is preferably 118 nm or more, and is preferably 138 nm or less, and more preferably 128 nm or less.

The NZ factor (NZq) of the λ/4 plate is usually 0.00±0.05. The NZ factor (NZq) possessed by the λ/4 plate means that a refractive index nz in a thickness direction of the λ/4 plate is large. When the refractive index nz in the thickness direction is large, apparent angle errors of the slow axis of the λ/2 plate and the slow axis of the λ/4 plate viewed from a tilt direction can be compensated. As a result, the circularly polarizing plate of the present invention can effectively reduce reflection of outside light in a tilt direction. That the λ/4 plate has the NZ factor (NZq) of approximately 0.0 as described above means that the λ/4 plate has optical uniaxiality. When the λ/4 plate has such optical uniaxiality, the circularly polarizing plate of the present invention can effectively reduce reflection of outside light particularly in a tilt direction.

Compensation of the apparent angle errors of the slow axis of the λ/2 plate and the slow axis of the λ/4 plate when viewed from a tilt direction as mentioned above may possibly be achieved also by increasing a refractive index nz in a thickness direction of the λ/2 plate. However, according to studies of the present inventors, when the refractive index nz of the λ/2 plate in its thickness direction is increased, the refractive index nz of the λ/2 plate in its thickness direction tends to be increased excessively. Thus, it is difficult to stably produce the λ/2 plate having an appropriate refractive index nz in the thickness direction. Therefore, from the viewpoint of improving productivity of the circularly polarizing plate that can reduce reflection of outside light in a tilt direction, the λ/4 plate desirably has such a large refractive index nz in the thickness direction as described above.

Further, the λ/4 plate has a wavelength dispersion different from that of the λ/2 plate. The wavelength dispersion of a given phase difference film is represented by a value obtained by dividing the in-plane phase difference at a wavelength of 400 nm by the in-plane phase difference at a wavelength of 550 nm. Therefore, the wavelength dispersion of the λ/2 plate is represented by "Reh(400)/Reh(550)", and the wavelength dispersion of the λ/4 plate is represented by "Req(400)/Req(550)". Here, Reh(400) is the in-plane phase difference of the λ/2 plate at a wavelength of 400 nm, Reh(550) is the in-plane phase difference of the λ/2 plate at a wavelength of 550 nm, Req(400) is the in-plane phase difference of the λ/4 plate at a wavelength of 400 nm, and Req(550) is the in-plane phase difference of the λ/4 plate at a wavelength of 550 nm. By combining the λ/2 plate and the λ/4 plate having different wavelength dispersions, reflection of outside light can be reduced in the front direction of the circularly polarizing plate of the present invention.

Further, in the circularly polarizing plate of the present invention, the following formula (A) is preferably satisfied.

Reh(400)/Reh(550)<Req(400)/Req(550)  (A)

By satisfying this, reflection of outside light can be effectively reduced in the front direction of the circularly polarizing plate.

Further, in the circularly polarizing plate of the present invention, the following formula (B) is preferably satisfied.

Req(400)/Req(550)−Reh(400)/Reh(550)=0.12±0.08  (B)

By satisfying this, reflection of outside light can be particularly effectively reduced in the front direction of the circularly polarizing plate.

The λ/4 plate has a slow axis in a direction forming a specific angle θq relative to an absorption axis of a polarizing film. Regarding this feature, the range of the above-mentioned angle θq is usually 90°±20°. When the angle θq of the slow axis of the λ/4 plate formed relative to the absorption axis of the polarizing film falls within the above-mentioned range, a broadband λ/4 plate can be provided by combining the λ/2 plate and the λ/4 plate. As a result, the circularly polarizing plate of the present invention can suppress light reflection in a wide wavelength range in both a front direction and a tilt direction. Further, the angle θq of the slow axis of the λ/4 plate formed relative to the absorption axis of the polarizing film is preferably 90°±15.0°. Accordingly, the circularly polarizing plate of the present invention can effectively reduce reflection of outside light particularly in a tilt direction.

As the long-length λ/4 plate having the optical characteristics described above, a resin film is usually used. The resin is preferably a thermoplastic resin. Further, the λ/4 plate may be a resin film of single layer structure having only one layer, and may also be a resin film of multilayer structure having two or more layers.

Of these, the λ/4 plate preferably includes a layer formed of a material having a negative intrinsic birefringence value, because the λ/4 plate is easily produced. As the material having a negative intrinsic birefringence value, usually a resin having a negative intrinsic birefringence value is used. The resin having a negative intrinsic birefringence value contains a polymer having a negative intrinsic birefringence value. Examples of the polymer may include a homopolymer of styrene or a styrene derivative and a polystyrene-based polymer containing a copolymer of styrene or a styrene derivative and an optional monomer; a polyacrylonitrile polymer; a polymethyl methacrylate polymer; or a multicomponent copolymer thereof. Examples of the above-mentioned optional monomer copolymerizable with styrene or a styrene derivative may preferably include acrylonitrile, maleic anhydride, methyl methacrylate, and butadiene. One type of these polymers may be used alone, and two or more types thereof may also be used in combination at any ratio.

Of these, the polystyrene-based polymer is preferable from the viewpoint of excellent expression of phase difference, and further the copolymer of styrene or a styrene derivative and maleic anhydride is particularly preferable from the viewpoint of excellent heat resistance. In this case, the amount of the structural unit (maleic anhydride unit) having a structure formed by polymerizing maleic anhydride, relative to 100 parts by weight of the polystyrene-based polymer, is preferably 5 parts by weight or more, more preferably 10 parts by weight or more, and particularly preferably 15 parts by weight or more, and is preferably 30 parts by weight or less, more preferably 28 parts by weight or less, and particularly preferably 26 parts by weight or less.

The ratio of the polymer in the resin having a negative intrinsic birefringence value is preferably 50% by weight to 100% by weight, more preferably 70% by weight to 100% by weight, and particularly preferably 90% by weight to 100% by weight. When the ratio of the polymer falls within the above-mentioned range, the λ/4 plate can express appropriate optical characteristics.

The resin having a negative intrinsic birefringence value may contain an additive in addition to the above-mentioned polymer. Examples of the additive may include the same additives as those that may be contained in the resin having a positive intrinsic birefringence value. One type of the additives may be used alone, and two or more types thereof may also be used in combination at any ratio.

The glass transition temperature Tg of the resin having a negative intrinsic birefringence value is preferably 80° C. or higher, more preferably 90° C. or higher, further preferably 100° C. or higher, exceptionally preferably 110° C. or higher, and particularly preferably 120° C. or higher. When the glass transition temperature Tg of the resin having a negative intrinsic birefringence value is high, orientation relaxation of the resin having a negative intrinsic birefringence value can be reduced. There is no particular limitation on an upper limit of the glass transition temperature Tg of the resin having a negative intrinsic birefringence value, but it is usually 200° C. or lower.

Some of the resins having a negative intrinsic birefringence value may have low mechanical strength. For example, a resin containing the polystyrene-based polymer tends to have low mechanical strength. Therefore, the λ/4 plate including a layer that is formed of the resin having a negative intrinsic birefringence value preferably includes a protective layer capable of protecting the layer formed of the resin having a negative intrinsic birefringence value, in combination with the layer formed of the resin having a negative intrinsic birefringence value.

Any layer may be used as the protective layer so long as the advantageous effects of the present invention are not significantly impaired. For example, a layer formed of a resin having a positive intrinsic birefringence value may be used as the protective layer. In such a case, an in-plane phase difference and a thickness-direction phase difference of the protective layer are preferably close to zero from the viewpoint of facilitating the adjustment of a phase difference of the λ/4 plate. An example of the method of allowing the in-plane phase difference and the thickness-direction phase difference of the protective layer to approach zero may be a method of setting the glass transition temperature of the resin contained in the protective film to be lower than that of the resin having a negative intrinsic birefringence value.

Further the protective layer may be formed on one surface or both surfaces of the layer that is formed of the resin having a negative intrinsic birefringence value.

When the λ/4 plate is a resin film made of a thermoplastic resin as described above, the λ/4 plate may be produced by preparing a second pre-stretch film made of a thermoplastic resin and stretching the second pre-stretch film so as to express a desired phase difference. For example, when the λ/4 plate includes a layer formed of a resin having a negative intrinsic birefringence value, the λ/4 plate is preferably produced by a production method including a third step (c) of preparing a second pre-stretch film including a layer formed of a resin having a negative intrinsic birefringence value and a fourth step (d) of stretching the prepared second pre-stretch film in one direction to obtain the λ/4 plate having a slow axis in a direction perpendicular to the stretching direction.

In the third step (c), a second pre-stretch film including a layer formed of a resin having a negative intrinsic birefringence value is prepared. The second pre-stretch film may be produced by a melt molding method or a solution casting method, and the melt molding method is preferable. As the melt molding method, an extrusion molding method, an inflation molding method, and a press molding method are preferable, and the extrusion molding method is particularly preferable.

When the second pre-stretch film is produced as a multilayer film that includes, for example, a layer formed of a resin having a negative intrinsic birefringence value and a protective layer, methods such as: a co-extrusion molding method such as a co-extrusion T-die method, a co-extrusion inflation method, and a co-extrusion lamination method; a film lamination molding method such as dry lamination; and a coating molding method such as coating a certain layer with a resin solution which constitutes a layer other than the certain layer may be used. Of these, the co-extrusion molding method is preferable from the viewpoint of an excellent production efficiency and the viewpoint of eliminating residual volatile components such as a solvent in the λ/4 plate. Among the co-extrusion molding methods, the co-extrusion T-die method is preferable. The co-extrusion T-die method is performed in a feed block system and a multi-manifold system, and the multi-manifold system is further preferable since fluctuations in the layer thickness can be reduced.

The second pre-stretch film is usually obtained as a long-length resin film. By preparing the second pre-stretch film as a long-length resin film, upon production of the λ/4 plate, a part or all of production steps can be performed by in-line process so that the production can be performed simply and efficiently.

After the second pre-stretch film is prepared in the third step (c), the fourth step (d) of stretching the second pre-stretch film is performed. The stretching in the fourth step (d) usually expresses a desired phase difference in a layer formed of a resin having a negative intrinsic birefringence value, and thus the λ/4 plate is obtained as a stretched film. The obtained λ/4 plate usually has a slow axis in a direction perpendicular to a stretching direction.

As a stretching method in the fourth step (d), for example, the same stretching methods as described in the method for producing the λ/2 plate may be mentioned. Further, the stretching may be performed once or two or more times.

In the fourth step (d), uniaxial stretching in which the film is stretched only in one direction is performed to improve uniaxiality of the layer formed of a resin having a negative intrinsic birefringence value. In general, in the λ/4 plate obtained by stretching the resin having a negative intrinsic birefringence value, the NZ factor (NZq) tends to approach 0.0 when the uniaxiality is higher. When the λ/4 plate has high uniaxiality, the NZ factor (NZq) can be made close to 0.0. Therefore, a circularly polarizing plate provided with the λ/4 plate can reduce reflection of outside light in a tilt direction more effectively.

When the second pre-stretch film is stretched only in one direction, the stretching may be performed in any direction. In particular, when the second pre-stretch film is a long-length film, the second pre-stretch film is preferably stretched in the lengthwise direction of the second pre-stretch film. Similar to the method for producing the λ/2 plate, such stretching in the lengthwise direction may be performed, for example, by a roller stretching machine while the second pre-stretch film is continuously conveyed in its lengthwise direction.

The stretching ratio in the fourth step (d) is preferably 1.1 times or more, more preferably 1.15 times or more, and particularly preferably 1.2 times or more, and is preferably 4 times or less, more preferably 3 times or less, and particularly preferably 2 times or less. When the stretching ratio in the fourth step (d) is confined within the above-mentioned range, the λ/4 plate having desired optical characteristics can be obtained.

The stretching temperature in the fourth step (d) is preferably 110° C. or higher, more preferably 115° C. or higher, and particularly preferably 120° C. or higher, and is preferably 150° C. or lower, more preferably 140° C. or lower, and particularly preferably 130° C. or lower.

When the stretching temperature in the fourth step (d) falls within the above-mentioned range, molecules contained in the second pre-stretch film can be reliably oriented, and thus the λ/4 plate having desired optical characteristics can be easily obtained.

Further, the production method of the λ/4 plate described above may also include an optional step in addition to the steps described above.

For example, the same optional steps as exemplified in the production method of the λ/2 plate may be performed.

Further, as the λ/4 plate having the optical characteristics described above, a film including an optical anisotropic layer containing fixed discotic liquid crystalline molecule may be used. The optical anisotropic layer containing the discotic liquid crystalline molecule can easily have an increased refractive index in its thickness direction. Therefore, by using such an optical anisotropic layer containing the discotic liquid crystalline molecule, the λ/4 plate having a preferable NZ factor (NZq) can be easily produced.

The λ/4 plate including the optical anisotropic layer described above may be produced by forming a layer containing the discotic liquid crystalline molecule on a supporting body, orienting the discotic liquid crystalline molecule contained in the layer, and fixing the discotic liquid crystalline molecule while maintaining its orientation.

Any supporting body may be used in a case where the supporting body is peeled off from the optical anisotropic layer after forming the optical anisotropic layer. On the other hand, a transparent supporting body is usually used in a case where the supporting body is not peeled off from the optical anisotropic layer after forming the optical anisotropic layer. The term "transparent supporting body" herein means that the supporting body has a total light transmittance of 80% or more.

As the transparent supporting body, an optically isotropic supporting body is preferably used. The term "optically isotropic" herein means that the supporting body has an in-plane phase difference of usually 0 to 20 nm, preferably 0 to 10 nm. As such a transparent supporting body, a resin film may be used. Examples of such a resin film may include a cyclic polyolefin film, a cellulose ester film, a polyvinyl alcohol film, a polyimide film, a UV permeable acrylic film, a polycarbonate film, a polysulfone film, a polyether sulfone film, an epoxy polymer film, and a polystyrene film. Of these, the cyclic polyolefin film and the cellulose ester film are preferable from the viewpoint of transparency, low hygroscopicity, size stability, and lightweight property. Further, the λ/2 plate may be used as the supporting body.

The thickness of the supporting body is preferably 20 μm or more, and more preferably 50 μm or more, and is preferably 500 μm or less, and more preferably 200 μm or less.

The surface of the supporting body may be subjected to a surface treatment. For example, a glow discharge treatment, a corona discharge treatment, an ultraviolet (UV) treatment, a flame treatment, and the like may be performed to improve the adhesion of the surface subjected to the surface treatment.

For producing an optical anisotropic layer with an increased refractive index in its thickness direction to obtain the λ/4 plate having a desired NZ factor (NZq), the discotic liquid crystalline molecule is preferably oriented substantially perpendicular to the surface of the supporting body. Specifically, the discotic liquid crystalline molecule is oriented preferably at an average tilt angle in a range of 50° to 90° relative to the surface of the supporting body. In order to orient the discotic liquid crystalline molecule in this manner, the surface of the supporting body on which the optical anisotropic layer is formed is preferably subjected to an orientation treatment capable of imparting orientation regulation force onto the treated surface. Examples of the orientation treatment may include a rubbing treatment performed on the surface of the supporting body. Still another example of the orientation treatment may be a treatment for forming an orientation film on the surface of the supporting body.

As the orientation film described above, an orientation film having low surface energy is usually used. By using the orientation film having low surface energy, the discotic liquid crystalline molecule can be oriented in a vertical direction. Examples of such an orientation film may include a polymer film having a functional group capable of lowering the surface energy of the orientation film.

As the functional group capable of lowering the surface energy of the orientation film, a hydrocarbon group having 10 or more carbon atoms is preferable. The hydrocarbon group is preferably introduced into a side chain rather than a main chain of the polymer to allow the hydrocarbon group to exist on the surface of the orientation film.

As the hydrocarbon group, an aliphatic group, an aromatic group, and a combination thereof may be used. Further, the aliphatic group may be in a cyclic, branched, or linear form. The aliphatic group is preferably an alkyl group (that may be a cycloalkyl group) or an alkenyl group (that may be a cycloalkenyl group). The hydrocarbon group may have a substituent group which does not exhibit strong hydrophilicity, and an examples thereof is a halogen atom. The number of carbon atoms of the hydrocarbon group is preferably 10 to 100, more preferably 10 to 60, and particularly preferably 10 to 40.

The main chain of the polymer forming the orientation film preferably has a polyimide structure or a polyvinyl alcohol structure. Therefore, as a material of the orientation film, a polyimide having a hydrocarbon group and a polyvinyl alcohol having a hydrocarbon group are preferable.

The polyimide may be usually synthesized by a condensation reaction of a tetracarboxylic acid and a diamine. In this reaction, two or more types of tetracarboxylic acids or two or more types of diamines may be used to synthesize a polyimide as a copolymer. In such a polyimide, the hydrocarbon group may be present at a structural unit derived from the tetracarboxylic acid, at a structural unit derived from the diamine, and at both structural units.

When the hydrocarbon group is introduced into the polyimide, a steroid structure is preferably formed on a main chain or a side chain of the polyimide. The steroid structure present on the side chain corresponds to a hydrocarbon group having 10 or more carbon atoms and usually has a function of orienting the discotic liquid crystalline molecule in a vertical direction. The term "steroid structure" herein refers to a cyclopentanohydrophenanthrene ring structure or a ring structure in which a part of bonds forming the cyclopentanohydrophenanthrene ring structure are converted to double bonds to an extent to keep an aliphatic ring (to an extent not to form an aromatic ring).

The polyvinyl alcohol includes a structural unit containing the hydrocarbon group having 10 or more carbon atoms in a range of preferably 2 mol % to 80 mol %, and further preferably 3 mol % to 70 mol %.

Preferable examples of the polyvinyl alcohol containing the hydrocarbon group may include ones represented by the following formula (I):

-(VA1)$_x$-(HyC)$_y$-(VAc)$_z$-    (I).

In the formula (I), VA1 represents a vinyl alcohol structural unit.

In the formula (I), HyC represents a structural unit containing a hydrocarbon group having 10 or more carbon atoms.

In the formula (I), VAc represents a vinyl acetate structural unit.

In the formula (I), x represents a ratio of the vinyl alcohol structural unit and it is usually 20 mol % or more, preferably 25 mol % or more, and usually 95 mol % or less, and is preferably 90 mol % or less.

In the formula (I), y represents a ratio of the structural unit HyC containing the hydrocarbon group having 10 or more carbon atoms and it is usually 2 mol % or more, preferably 3 mol % or more, and usually 80 mol % or less, and is preferably 70 mol % or less.

In the formula (I), z represents a ratio of the vinyl acetate structural unit and it is usually 0 mol % or more, preferably 2 mol % or more, and usually 30 mol % or less, and is preferably 20 mol % or less.

Preferable examples of the structural unit (HyC) containing the hydrocarbon group having 10 or more carbon atoms may include ones represented by the following formula (HyC-I) or the formula (HyC-II).

In the formula (HyC-I), L$^2$ represents a divalent linking group selected from —O—, —CO—, —SO$_2$—, —NH—, an alkylene group, an arylene group, and combinations thereof.

In the formula (HyC-II), L$^2$ represents a single bond or a divalent linking group selected from —O—, —CO—, —SO$_2$—, —NH—, an alkylene group, an arylene group, and combinations thereof.

Examples of the divalent linking group formed by the combination of the above-mentioned groups are shown below.

—O—CO—
—O—CO-alkylene group-O—
—O—CO alkylene group-CO—NH—
—O—CO-alkylene group-NH—SO$_2$-arylene group-O—-arylene group-NH—CO—
-arylene group-CO—O—arylene group-CO—NH—
-arylene group-O—
—O—CO—NH-arylene group-NH—CO—

In the formula (HyC-I) and formula (HyC-II), $R^1$ and $R^2$ each represent a hydrocarbon group having 10 or more carbon atoms. The upper limit of the number of carbon atoms in $R^1$ and $R^2$ is not particularly limited, but each of which may be 30 or less.

The polymerization degree of the polymer contained in the orientation film is preferably 200 or more, and more preferably 300 or more, and is preferably 5,000 or less, and more preferably 3,000 or less.

The weight-average molecular weight of the polymer contained in the orientation film is preferably 9,000 or more, and more preferably 13,000 or more, and is preferably 200,000 or less, and more preferably 130,000 or less.

Further, as the polymers that may be contained in the orientation film, one type thereof may be used alone, and two or more types thereof may also be used in combination at any ratio.

Further, the orientation film is preferably subjected to a rubbing treatment. The rubbing treatment may be carried out by rubbing a surface of the orientation film described above in a certain direction once or a plurality of times with a member such as paper and cloth.

In the production method of the λ/4 plate using the discotic liquid crystalline molecule, a layer containing the discotic liquid crystalline molecule is formed on the supporting body described above.

Examples of the discotic liquid crystalline molecule may include ones described in: C. Destrade et al., Mol. Crysr. Liq. Cryst., vol. 71, page 111 (1981); Quarterly Chemical Review by the Chemical Society of Japan, No. 22, Chemistry of Liquid Crystals, Chapter 5, Section 2 of Chapter 10 (1994); B. Kohne et al., Angew. Chem. Soc. Chem. Comm., page 1794 (1985); and J. Zhang et al., J. Am. Chem. Soc., vol. 116, page 2655 (1994).

A polymerizable discotic liquid crystalline molecule is preferably used from the viewpoint of fixing the discotic liquid crystalline molecule in the optical anisotropic layer. The polymerization of the discotic liquid crystalline molecule is described, for example, in Japanese Patent Application Laid-Open No. Hei. 8-27284 A.

In order to fix the discotic liquid crystalline molecule by polymerization, the discotic liquid crystalline molecule preferably has a polymerizable group bonded to a discotic core of the discotic liquid crystalline molecule as a substituent group. However, when the polymerizable group is directly bonded to the discotic core, it may become difficult to maintain an orientation state in a polymerization reaction. Therefore, a linking group is preferably introduced between the discotic core and the polymerizable group.

Examples of particularly preferable discotic liquid crystalline molecule may include chemical compounds represented by the following formula (II):

$$D(\text{-}L\text{-}P)_n \quad (II).$$

In the formula (II), D represents a discotic core. Examples of the discotic core (D) in the formula (II) are shown below.

In the following examples, LP and PL each represent a combination of a divalent linking group (L) and a polymerizable group (P).

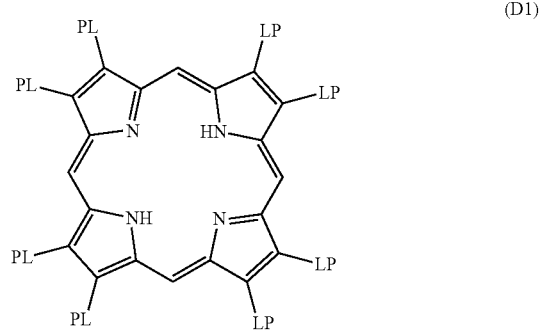

(D1)

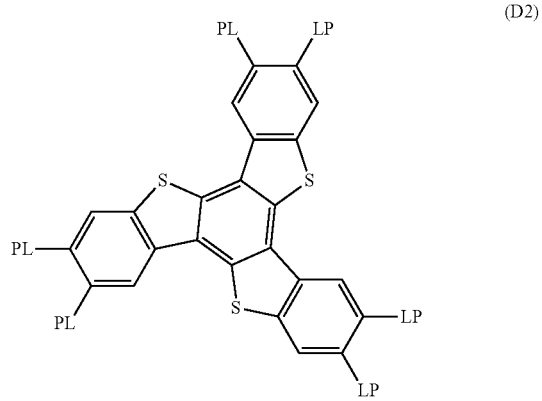

(D2)

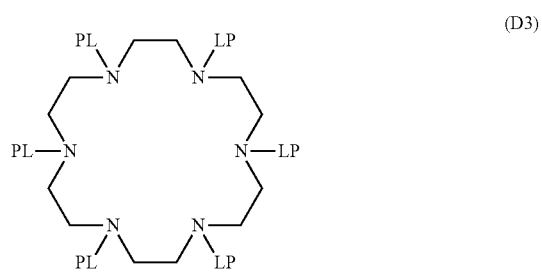

(D3)

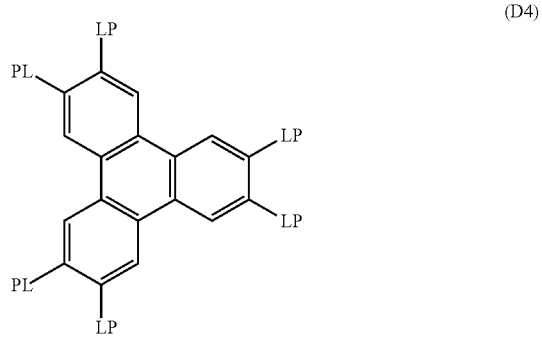

(D4)

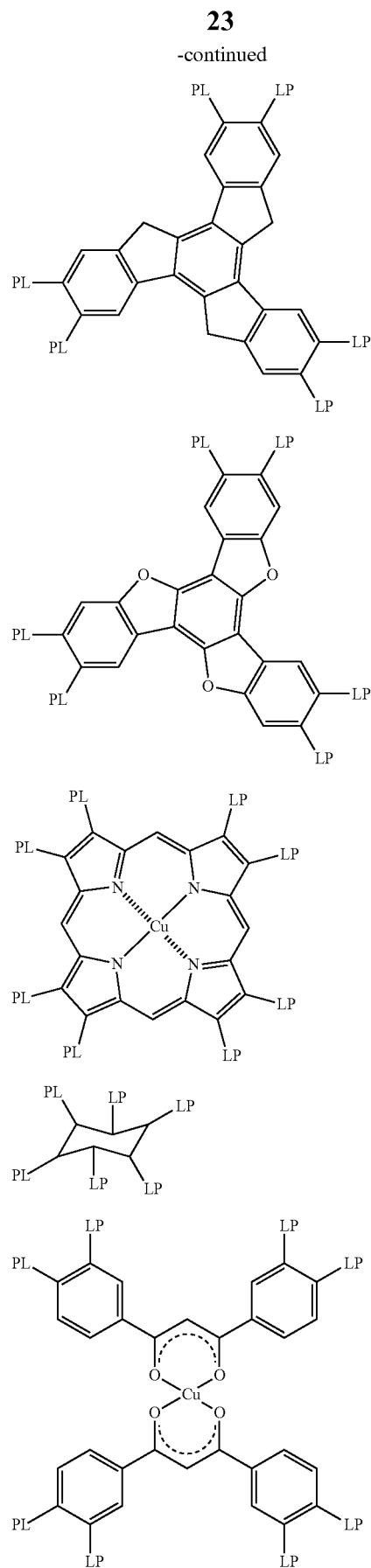
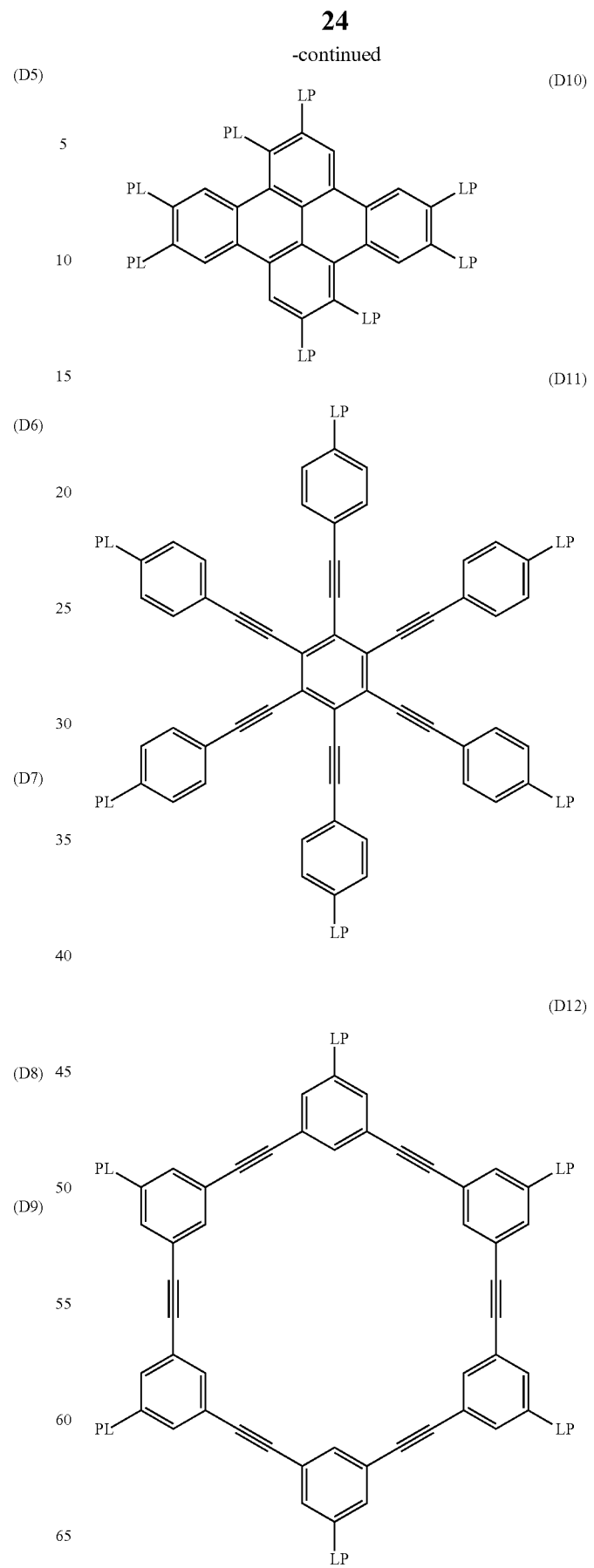

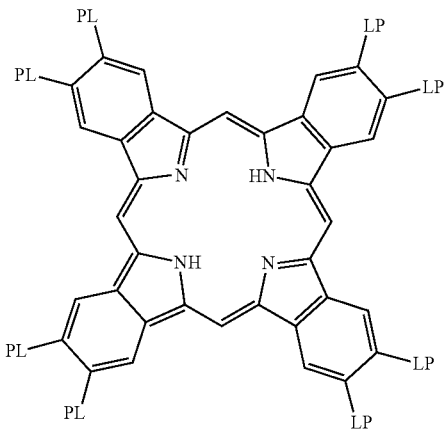

(D13)

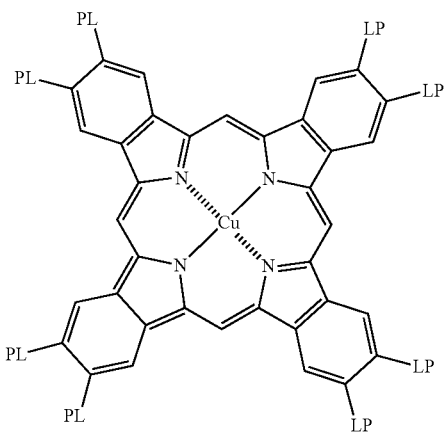

(D14)

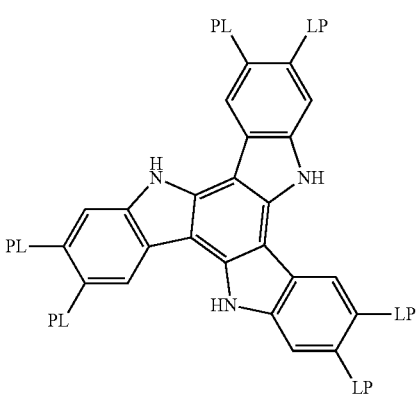

(D15)

In the formula (II), each L independently represents a divalent linking group. Examples of the divalent linking group (L) in the formula (II) may include a divalent linking group selected from the group consisting of an alkylene group, an alkenylene group, an arylene group, —CO—, —NH—, —O—, —S—, and combinations thereof. Of these, the divalent linking group (L) is preferably a group obtained by combining at least two divalent groups selected from the group consisting of an alkylene group, an alkenylene group, an arylene group, —CO—, —NH—, —O—, and —S—. Further, the divalent linking group (L) is particularly preferably a group obtained by combining at least two divalent groups selected from the group consisting of an alkylene group, an alkenylene group, an arylene group, —CO—, and —O—.

In the examples of the divalent linking group (L) described above, the number of carbon atoms of the alkylene group is preferably 1 to 12, the number of carbon atoms of the alkenylene group is preferably 2 to 12, and the number of carbon atoms of the arylene group is 6 to 10. Further, the alkylene group, the alkenylene group, and the arylene group may have a substituent group such as an alkyl group, a halogen atom, cyano, an alkoxy group, and an acyloxy group.

Specific examples of the divalent linking group (L) are shown below. In the following examples, a left side of a chemical formula bonds to the discotic core (D) and a right side bonds to the polymerizable group (P). AL represents an alkylene group or an alkenylene group, and AR represents an arylene group.

L1: -AL-CO—O-AL-
L2: -AL-CO—O-AL-O—
L3: -AL-CO—O-AL-O-AL-
L4: -AL-CO—O-AL-O—CO—
L5: —CO-AR-O-AL-
L6: —CO-AR-O-AL-O—
L7: —CO-AR-O-AL-O—CO
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AL-AR-O-AL-O—CO—
L17: —O—CO-AR-O-AL-CO—
L18: —O—CO-AR-O-AL-O—CO—
L19: —O—CO-AR-O-AL-O-AL-O—CO—
L20: —O—CO-AR-O-AL-O-AL-O-AL-O—CO—
L21: —S-AL-
L22: —S-AL-O—
L23: —S-AL-O—CO—
L24: —S-AL-S-AL-
L25: —S-AR-AL-

In the formula (II), P independently represents a polymerizable group. The type of the polymerizable group (P) in the formula (II) may be determined in accordance with a type of a polymerization reaction. Examples of the polymerizable group (P) are shown below.

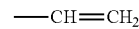

(P1)

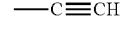

(P2)

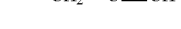

(P3)

(P4)

(P5)

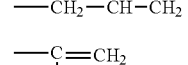

(P6)

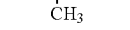

(P7)

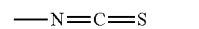

(P8)

(P9)

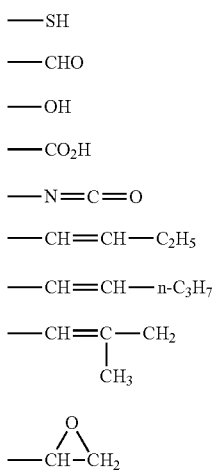

(P10) —SH
(P11) —CHO
(P12) —OH
(P13) —CO₂H
(P14) —N=C=O
(P15) —CH=CH—C₂H₅
(P16) —CH=CH—n-C₃H₇
(P17) —CH=C(CH₃)—CH₂
(P18) —CH–CH₂ (epoxide)

Among these polymerizable groups (P), unsaturated polymerizable groups (P1, P2, P3, P7, P8, P15, P16, and P17) and epoxy groups (P6 and P18) are preferable, the unsaturated polymerizable groups are more preferable, and ethylenically unsaturated polymerizable groups (P1, P7, P8, P15, P16, and P17) are particularly preferable.

In the formula (II), n represents an integer of 4 or more and 12 or less. The specific value of the integer n may be determined in accordance with a type of the discotic core (D).

In the formula (II), a plurality of combinations of L and P may be different from one another, however they are preferably the same.

Further, one type of the discotic liquid crystalline molecules may be used alone, and two or more types thereof may also be used in combination at any ratio. For example, the discotic liquid crystalline molecule having an asymmetric carbon atom in the divalent linking group may be used in combination with the discotic liquid crystalline molecule having no asymmetric carbon atom in the divalent linking group.

For forming the layer containing the discotic liquid crystalline molecule on the supporting body, a coating liquid containing the discotic liquid crystalline molecule is usually applied onto a surface of the supporting body. In this process, the coating liquid may contain an optional component other than the discotic liquid crystalline molecule. Examples of the optional component may include a solvent, a polymerization initiator, and the like.

As the solvent, an organic solvent may be used. Examples of the organic solvent may include amide solvents such as N,N-dimethylformamide; sulfoxide solvents such as dimethylsulfoxide; heterocyclic compound solvents such as pyridine; hydrocarbon solvents such as benzene and hexane; alkyl halide solvents such as chloroform and dichloromethane; ester solvents such as methyl acetate and butyl acetate; ketone solvents such as acetone and methyl ethyl ketone; and ether solvents such as tetrahydrofuran and 1,2-dimethoxyethane. Of these, the alkyl halide solvents and the ketone solvents are preferable. One type of the solvents may be used alone, and two or more types thereof may also be used in combination at any ratio.

As the polymerization initiator, a thermal polymerization initiator and a photopolymerization initiator may be used. Of these, the photopolymerization initiator is preferable. Examples of the photopolymerization initiator may include an α-carbonyl compound (described in the respective specifications of U.S. Pat. Nos. 2,367,661 and 2,367,670), an acyloin ether (described in the specification of U.S. Pat. No. 2,448,828), an α-hydrocarbon-substituted aromatic acyloin compound (described in the specification of U.S. Pat. No. 2,722,512), a polynuclear quinone compound (described in the respective specifications of U.S. Pat. Nos. 3,046,127 and 2,951,758), a combination of a triarylimidazole dimer and a p-aminophenyl ketone (described in the specification of U.S. Pat. No. 3,549,367), acridine and phenazine compounds (described in Japanese Patent Application Laid-Open No. Sho. 60-105667 A and the specification of U.S. Pat. No. 4,239,850), and an oxadiazole compound (described in the specification of U.S. Pat. No. 4,212,970). Further, one type of the polymerization initiators may be used alone, and two or more types thereof may also be used in combination at any ratio. The amount of the polymerization initiator in the coating liquid is preferably 0.01 parts by weight or more, and more preferably 0.5 parts by weight or more, and is usually 20 parts by weight or less, and preferably 5 parts by weight or less, with respect to 100 parts by weight of the solid content of the coating liquid.

Examples of the method for coating the coating liquid may include a die coating method, a curtain coating method, an extrusion coating method, a roller coating method, a spin coating method, a dip coating method, a bar coating method, a spray coating method, a slide coating method, a printing coating method, a gravure coating method, a cap coating method, and a dipping method.

After the coating liquid is applied, a step of drying a film of the coating liquid formed on the supporting body is performed if necessary. Any drying method may be employed, and examples thereof may include heating drying, air drying, drying under reduced-pressure, and heating drying under reduced-pressure.

After the coating liquid is applied, further a step of orienting the discotic liquid crystalline molecule may be performed if necessary. The discotic liquid crystalline molecule is usually oriented by performing a thermal treatment. Further, the discotic liquid crystalline molecule may be sometimes oriented in the step of drying the coating liquid. In this case, the step of drying the film of the coating liquid and the step of orienting the discotic liquid crystalline molecule may be performed during the same step.

After the discotic liquid crystalline molecule is oriented as described above, the discotic liquid crystalline molecule is fixed while maintaining its orientation state. Fixation of the discotic liquid crystalline molecule is usually performed by polymerizing the discotic liquid crystalline molecule. Polymerization may be performed by heating or light irradiation, however light irradiation is preferable. Further, an ultraviolet ray is preferably used for light irradiation. The light irradiation energy is preferably 20 mJ/cm² or more, and more preferably 50 mJ/cm² or more, and is preferably 800 mJ/cm² or less, and more preferably 100 mJ/cm² or less. Further, the light irradiation may be performed under a heating condition to promote a photopolymerization reaction.

In this manner, the optical anisotropic layer containing the discotic liquid crystalline molecule fixed in the oriented state can be obtained. Such an optical anisotropic layer expresses a desired phase difference according to the orientation of the discotic liquid crystalline molecule. As a result, the λ/4 plate can be obtained. The optical anisotropic layer described above has a thickness of preferably 0.1 μm or more, more preferably 0.5 µm or more, and particularly preferably 1 µm or more, and is preferably 10 µm or less, and more preferably 5 µm or less.

The optical anisotropic layer may be peeled off from the supporting body, thereby to be used as the λ/4 plate. The discotic liquid crystalline molecule fixed in the oriented state can maintain the oriented state even after the optical anisotropic layer is peeled off from the supporting body. By peeling the supporting body, the thickness of the λ/4 plate can be reduced. However, when the λ/2 plate is used as the supporting body, the λ/2 plate is preferably not peeled from the optical anisotropic layer.

The total light transmittance of the λ/4 plate is preferably 80% or more.

The haze of the λ/4 plate is preferably 5% or less, more preferably 3% or less, particularly preferably 1% or less, and ideally 0%.

The amount of the volatile component contained in the λ/4 plate is preferably 0.1% by weight or less, more preferably 0.05% by weight or less, further preferably 0.02% by weight or less, and ideally zero. By reducing the amount of the volatile component, size stability of the λ/4 plate can be improved and changes with the lapse of time in optical characteristics such as a phase difference can be reduced.

The saturated water absorption rate of the λ/4 plate is preferably 0.03% by weight or less, further preferably 0.02% by weight or less, particularly preferably 0.01% by weight or less, and ideally zero. When the saturated water absorption rate of the λ/4 plate falls within the above-mentioned range, changes with the lapse of time in optical characteristics such as an in-plane phase difference can be reduced.

The thickness of the λ/4 plate is preferably 40 µm or more, more preferably 45 µm or more, and particularly preferably 50 µm or more, and is preferably 80 µm or less, more preferably 75 µm or less, and particularly preferably 70 µm or less. When the thickness of the λ/4 plate is equal to or more than the lower limit value of the above-mentioned range, a desired phase difference can be easily expressed. When it is equal to or less than the upper limit value, the thickness of the circularly polarizing plate can be reduced.

5. Optional Layer

The circularly polarizing plate of the present invention may include an optional layer other than the polarizing film, the λ/2 plate, and the λ/4 plate within the range in which the advantageous effects of the present invention are not significantly impaired.

For example, the circularly polarizing plate of the present invention may include a protective film layer for preventing a scratch. For example, the circularly polarizing plate of the present invention may include an adhesive layer or a tacky layer for adhesion of the polarizing film and the λ/2 plate, as well as for adhesion of the λ/2 plate and the λ/4 plate.

6. Properties of Circularly Polarizing Plate

When the circularly polarizing plate of the present invention is provided on a surface that can reflect light, the circularly polarizing plate can effectively reduce reflection of outside light in both a front direction and a tilt direction. In particular, the circularly polarizing plate of the present invention is useful in that it can effectively reduce reflection of outside light in a wide wavelength range of visible region.

In general, when a multilayer film including a combination of the λ/4 plate having a slow axis forming an angle θ(λ/4) relative to a given reference direction and the λ/2 plate having a slow axis forming an angle θ(λ/2) relative to the reference direction satisfies the formula C: (θ(λ/4)=2θ(λ/2)+45°, this multilayer film can serve as a broadband λ/4 plate capable of imparting, to light passing through the multilayer film, an in-plane phase difference of an approximately quarter wavelength of the light in a wide wavelength range (see Patent Literature 2). When the circularly polarizing plate of the present invention includes the λ/2 plate and the λ/4 plate that satisfy a relation approximate to the one represented by the formula C, a portion including the λ/2 plate and the λ/4 plate can function as a broadband λ/4 plate. In this manner, the circularly polarizing plate of the present invention can absorb circularly polarized light in a wide wavelength range and thus effectively reduce reflection of outside light.

Further, in the circularly polarizing plate of the present invention, the λ/4 plate expresses a large refractive index nz in the thickness direction. This refractive index nz in the thickness direction can compensate, as described above, apparent angle errors of the slow axis of the λ/2 plate and the slow axis of the λ/4 plate when the circularly polarizing plate is viewed from a tilt direction. As a result, the circularly polarizing plate of the present invention can absorb circularly polarized light in a wide wavelength range not only in a front direction but also in a tilt direction, and thus effectively reduce reflection of outside light.

7. Method for Producing Circularly Polarizing Plate

The circularly polarizing plate of the present invention may be produced by bonding together the polarizing film, the λ/2 plate, and the λ/4 plate described above. In this process, the polarizing film, the λ/2 plate, and the λ/4 plate are bonded together with their optical axes aligned in such a manner that a slow axis of the λ/2 plate and a slow axis of the λ/4 plate form a desired angle relative to an absorption axis of the polarizing film. Therefore, the method for producing the circularly polarizing plate of the present invention usually includes a step of bonding the polarizing film and the λ/2 plate together in such a manner that the slow axis of the λ/2 plate forms a specific angle θh (specifically 22.5°±10°) relative to the absorption axis of the polarizing film and a step of bonding the λ/2 plate and the λ/4 plate together in such a manner that the slow axis of the λ/4 plate forms a specific angle θq (specifically 90°±20°) relative to the absorption axis of the polarizing film.

Specifically, the circularly polarizing plate of the present invention may be produced, for example, by following production methods.

Production Method 1

A production method including:

a step of stretching a first pre-stretch film including a layer formed of a material having a positive intrinsic birefringence value in one direction to obtain a λ/2 plate having a slow axis in a stretching direction;

a step of stretching a second pre-stretch film including a layer formed of a material having a negative intrinsic birefringence value in one direction to obtain a λ/4 plate having a slow axis in a direction perpendicular to a stretching direction;

a step of bonding a polarizing film and the λ/2 plate together in such a manner that the slow axis of the λ/2 plate forms a specific angle θh relative to an absorption axis of the polarizing film; and a step of bonding the λ/2 plate and the λ/4 plate together in such a manner that the slow axis of the λ/4 plate forms a specific angle θq relative to the absorption axis of the polarizing film.

Production Method 2

A production method including:

a step of stretching a first pre-stretch film including a layer formed of a material having a positive intrinsic birefringence value in one direction to obtain a λ/2 plate having a slow axis in a stretching direction;

a step of forming a layer containing a discotic liquid crystalline molecule on a supporting body, orienting the discotic liquid crystalline molecule, and fixing the discotic liquid crystalline molecule to obtain a λ/4 plate;

a step of bonding a polarizing film and the λ/2 plate together in such a manner that the slow axis of the λ/2 plate forms a specific angle θh relative to an absorption axis of the polarizing film; and a step of bonding the λ/2 plate and the λ/4 plate together in such a manner that a slow axis of the λ/4 plate forms a specific angle θq relative to the absorption axis of the polarizing film.

In the production methods described above, either the step of bonding a multilayer film and the λ/2 plate together or the step of bonding the λ/2 plate and the λ/4 plate together may be performed first, or the two steps may be performed simultaneously.

Further, a tacky agent or an adhesive may be used, if necessary at the time of bonding.

When the circularly polarizing plate is produced by using the λ/4 plate including the optical anisotropic layer produced using the λ/2 plate as the supporting body, the λ/2 plate and the λ/4 plate may be obtained as a single multilayer film. When the λ/2 plate and the λ/4 plate are available as a single multilayer film in this manner, the circularly polarizing plate may be produced by bonding the multilayer film and the polarizing film together.

Further, when the circularly polarizing plate is produced by using the λ/4 plate including the supporting body and the optical anisotropic layer, a step of peeling off the supporting body from the optical anisotropic layer may be performed at any time if necessary.

The polarizing film, the λ/2 plate, and the λ/4 plate may be bonded together as long-length films. However, in order to facilitate alignment of their optical axes, sheet pieces of the polarizing film, the λ/2 plate, and the λ/4 plate may be cut out from the long-length polarizing film, λ/2 plate, and λ/4 plate, respectively, and the cut-out sheet pieces of the polarizing film, the λ/2 plate, and the λ/4 plate may be bonded together to produce the circularly polarizing plate.

8. Broadband λ/4 Plate

The broadband λ/4 plate of the present invention is an optical member having a structure similar to the portion other than the polarizing film of the circularly polarizing plate of the present invention described above. Therefore, the broadband λ/4 plate of the present invention includes the λ/2 plate and the λ/4 plate described above. The λ/2 plate has a slow axis in a direction forming a specific angle θh (usually 22.5°±10°) relative to a certain reference direction, while the λ/4 plate has a slow axis in a direction forming a specific angle θq (usually 90°±20°) relative to the reference direction. The aforementioned reference direction corresponds to the direction of the absorption axis of the polarizing film in the circularly polarizing plate of the present invention.

The broadband λ/4 plate according to the present invention can have at least the following advantages.

The broadband λ/4 plate according to the present invention can provide light that passes through the broadband λ/4 plate in a front direction with an in-plane phase difference of approximately a quarter wavelength of the wavelength of the light, in a wide wavelength range.

The broadband λ/4 plate according to the present invention can provide light that passes through the broadband λ/4 plate in a tilt direction with an in-plane phase difference of approximately a quarter wavelength of the wavelength of the light, in a wide wavelength range.

Therefore, the circularly polarizing plate which can reduce reflection of light in both a front direction and a tilt direction in a wide wavelength range can be achieved by combining the broadband λ/4 plate according to the present invention with the polarizing film.

9. Organic Electroluminescent Display Device

The organic EL display device according to the present invention includes the circularly polarizing plate according to the present invention, or the broadband λ/4 plate according to the present invention.

When the organic EL display device according to the present invention includes the circularly polarizing plate, the circularly polarizing plate is usually provided on a display surface of the organic EL display device. Accordingly, the circularly polarizing plate can function as an antireflective film of the organic EL display device. That is, when the circularly polarizing plate is provided on the display surface of the organic EL display device such that the surface on the polarizing film side faces a viewing side, incident light from the outside of the device can be inhibited from being reflected inside the device and being emitted to the outside of the device. As a result, glare on the display surface of the display device can be suppressed. Specifically, only a part of linearly polarized light of the incident light from the outside of the device passes through the polarizing film. The light subsequently passes through the λ/2 plate and the λ/4 plate, thereby to be transformed into circularly polarized light. The circularly polarized light is reflected on a constituent (such as a reflective electrode in the organic EL element) which reflects light within the display device, and thereafter passes through the λ/4 plate and the λ/2 plate again, thereby to be linearly polarized light having its polarizing axis in a direction orthogonal to the polarizing axis of the incident linearly polarized light. The linearly polarized light does not pass through the polarizing film. As a result, the function of antireflection is achieved.

When the organic EL display device according to the present invention includes the broadband λ/4 plate, the organic EL display device may include the broadband λ/4 plate in an appropriately selected position.

10. Liquid Crystal Display Device

The liquid crystal display device of the present invention includes the circularly polarizing plate of the present invention or the broadband λ/4 film plate of the present invention.

When the liquid crystal display device of the present invention includes the circularly polarizing plate, the circularly polarizing plate is usually provided on a display surface of the liquid crystal display device. Accordingly, the circularly polarizing plate can function as an antireflective film for the liquid crystal display device. That is, when the circularly polarizing plate is provided on the display surface of the liquid crystal display device such that the surface on the polarizing film side faces a viewer side, incident light from the outside of the device can be inhibited from being reflected inside the device and being emitted to the outside of the device. As a result, glare of the display surface of the display device can be suppressed.

When the liquid crystal display device of the present invention includes the broadband λ/4 plate, the broadband λ/4 plate is usually provided on a viewer side of a liquid crystal panel in the liquid crystal display device. In this manner, the broadband λ/4 plate can function as a film that enhances the visibility of the display surface for an observer wearing polarizing sunglasses.

Specifically, the circularly polarizing plate is provided at a position closer to the display surface than a viewer-side polarizer of the liquid crystal panel in the liquid crystal display device. In this configuration, a slow axis of the λ/2 plate of the broadband λ/4 plate is set to form an angle of 22.5°±10° relative to an absorption axis of the viewer-side polarizer. In this manner, linearly polarized light passing through the viewer-side polarizer is converted to circularly polarized light by the broadband λ/4 plate, and thus, light coming from the display surface can be stably visually recognized through the polarizing sunglasses.

EXAMPLES

Hereinafter, the present invention will be specifically described by referring to Examples. However, the present invention is not limited to the following Examples. The present invention may be freely modified and practiced without departing from the scope of claims of the present invention and equivalents thereto.

Unless otherwise stated, "%" and "part" that represent an amount of a material in the following description are on the basis of weight. Unless otherwise stated, the operations described below were performed under the conditions of normal temperature and normal pressure.

Evaluation Method

Method for Measuring Phase Difference And NZ Factor

Using a phase difference measurement apparatus ("KO-BRA-21ADH" manufactured by Oji Scientific Instruments, Co. Ltd.), the in-plane phase difference and the thickness-direction phase difference were measured at a plurality of points at intervals of 50 mm in the width direction of a film. Average values of the values measured at these points were calculated. These average values were defined as the in-plane phase difference and the thickness-direction phase difference of the film. At this time, the measurement was performed at wavelengths of 400 nm, 550 nm, and 590 nm. The NZ factor was calculated from the in-plane phase difference and the thickness-direction phase difference thus obtained.

Visual Evaluation Method

A mirror having a planar reflective surface was prepared. This mirror was placed such that its reflective surface was in horizontal direction facing upward. The circularly polarizing plate was bonded on the reflective surface of this mirror such that the polarizing film side faced upward.

Thereafter, the circularly polarizing plate on the mirror was visually observed while the circularly polarizing plate was irradiated with sunlight on a sunny day. The observation was performed in both (i) the front direction at a polar angle of 0° and an azimuth angle of 0° and (ii) the tilt direction at a polar angle of 45° and an azimuth angle of 0° to 360°, of the circularly polarizing plate.

In the observation in (i) the front direction, it was evaluated whether reflection of sunlight is hardly noticeable and the circularly polarizing plate looks black.

In the observation in (ii) the tilt direction, it was evaluated whether the reflectivity and the color tone do not change with the rotation of the azimuth angle.

The above-mentioned visual evaluation was performed by 20 observers, and each observer ranked all results obtained in Examples and Comparative Examples and gave points in accordance with the ranking order (16 points for first place, 15 points for second place, . . . , 1 point for last place). Then, Examples and Comparative Examples were sorted in the order according to scores obtained by calculating the total points given by the observers and rated as A, B, C, D, and E in the descending order from the top group within the range of the scores.

Method for Calculating Reflectivity by Simulation

The circularly polarizing plates produced in Examples and Comparative Examples were modeled using, as a simulation software, "LCD Master" manufactured by SHINTEC, Inc., and the reflectivity of each of the modeled circularly polarizing plates was calculated.

The model for the simulation had a structure in which the λ/4 plate side of the circularly polarizing plate was bonded on a planar reflective surface of a mirror. Therefore, this model had a structure in which the polarizing film, the λ/2 plate, the λ/4 plate, and the mirror were provided in this order in the thickness direction.

In the above-mentioned model, the reflectivity when the circularly polarizing plate was irradiated with light from a D65 light source was calculated in (i) the front direction and (ii) the tilt direction of the circularly polarizing plate. Here, in (i) the front direction, the reflectivity in a direction at a polar angle of 0° and an azimuth angle of 0° was calculated. In (ii) the tilt direction, the reflectivity at a polar angle of 45° was calculated for every 5° in the azimuth angle direction within the azimuth angle range of 0° to 360°, and an average of the calculated values was employed as the reflectivity in the tilt direction of the modeled circularly polarizing plate. In the simulation, a surface reflection component actually generated on the surface of the polarizing film was eliminated from the reflectance.

Examples 1-1 to 1-9

1-i. Production of Polarizing Film

A long-length pre-stretch film made of a polyvinyl alcohol resin, which had been dyed with iodine, was prepared. This pre-stretch film was stretched in a lengthwise direction which forms an angle of 90° with respect to the width direction of the pre-stretch film, thereby to obtain a long-length polarizing film. This polarizing film had its absorption axis in the lengthwise direction of the polarizing film, and its transmission axis in the width direction of the polarizing film.

1-ii. Production of λ/2 Plate

A long-length cyclic olefin resin film ("ZEONOR FILM" manufactured by ZEON CORPORATION, glass transition temperature of 126° C.; thickness of 45 μm) obtained by molding a cyclic olefin resin in a film form by a melt extrusion method was prepared as a pre-stretch film. The cyclic olefin resin film was stretched in a lengthwise direction forming an angle of 90° relative to a width direction of the cyclic olefin resin film to obtain a long-length λ/2 plate. The stretch conditions in this process were set in a range of 120° C. to 150° C. for the stretching temperature and a range of 1.3 times to 3 times for the stretching ratio, so as to obtain a λ/2 plate having properties shown in Table 2 below. The λ/2 plate thus obtained had a slow axis in a lengthwise direction of the λ/2 plate.

1-iii. Production of λ/4 Plate

As a material having a negative intrinsic birefringence value, a styrene-maleic acid copolymer resin ("Daylark D332" manufactured by NOVA Chemicals Corp., glass transition temperature of 130° C., content of oligomer component of 3% by weight) was prepared.

As an acrylic resin for a protective layer, "Sumipex HT-55X" (glass transition temperature of 105° C.) manufactured by Sumitomo Chemical Co., Ltd. was prepared.

As an adhesive, a modified ethylene-vinyl acetate copolymer ("Modic AP A543" manufactured by Mitsubishi Chemical Corporation, Vicat softening point of 80° C.) was prepared.

The styrene-maleic acid copolymer resin, the acrylic resin, and the adhesive thus prepared were co-extruded to obtain a long-length pre-stretch film including a layer of the acrylic resin, a layer of the adhesive, a layer of the styrene-maleic acid copolymer resin, a layer of the adhesive, and a layer of the acrylic resin in this order. The thickness of the layer of the styrene-maleic acid copolymer resin in the pre-stretch film was adjusted in a range of 40 μm to 100 μm so as to obtain a λ/4 plate having properties shown in Table 1 below.

Subsequently, the pre-stretch film was stretched in its lengthwise direction forming an angle of 90° relative to its width direction, thereby to obtain a long-length λ/4 plate. The stretch conditions in this process were set in a range of 120° C. to 140° C. for the stretching temperature and a range of 1.2 times to 2.0 times for the stretching ratio, so as to obtain a λ/4 plate having properties shown in Table 2 below. The λ/4 plate thus obtained had a slow axis in a width direction of the λ/4 plate. In the λ/4 plate, no phase difference was expressed in the layer of the acrylic resin or the layer of the adhesive.

1-iv. Bonding

A sheet piece of the polarizing film, a sheet piece of the λ/2 plate, and a sheet piece of the λ/4 plate were obtained by cutting out the long-length polarizing film, the long-length λ/2 plate, and the long-length λ/4 plate, respectively. It is noted that the sheet piece of the λ/2 plate and the sheet piece of the λ/4 plate were cut out from the long-length λ/2 plate and the long-length λ/4 plate, respectively, such that directions of the slow axis of the λ/2 plate and the slow axis of the λ/4 plate form angles θh and θq, respectively, relative to the absorption axis of the polarizing film. The sheet pieces of the films were cut out in the same manner in the following Examples and Comparative Examples.

The sheet piece of the λ/2 plate was bonded to the sheet piece of the polarizing film using a tacky agent ("CS9621" manufactured by Nitto Denko Corporation) such that the slow axis of the λ/2 plate forms an angle of 22.5° in a counterclockwise direction relative to the absorption axis of the polarizing film as viewed from a side of the polarizing film. Further, the sheet piece of the λ/4 plate was bonded to the λ/2 plate using the tacky agent described above such that the slow axis of the λ/4 plate forms an angle of 90.0° in a counterclockwise direction relative to the absorption axis of the polarizing film as viewed from the side of the polarizing film. In this manner, a circularly polarizing plate including the polarizing film, a layer of the tacky agent, the λ/2 plate, a layer of the tacky agent, and the λ/4 plate in this order was obtained.

The circularly polarizing plate thus obtained was evaluated by the above-mentioned methods.

Example 2-1

2-1-i. Production of Polarizing Film

A long-length polarizing film was produced by the same method as that in the step (1-i. Production of Polarizing Film) of Examples 1-1 to 1-9.

2-1-ii. Production of λ/2 Plate

A long-length λ/2 plate having properties shown in Table 2 was produced by the same method as that in the step (1-ii. Production of λ/2 Plate) of Examples 1-1 to 1-9.

2-1-iii. Production of λ/4 Plate

Polymethyl methacrylate ("Sumipex EX" manufactured by Sumitomo Chemical Co., Ltd., glass transition temperature of 103° C.) was press-molded at 250° C. using a press molding machine to obtain a pre-stretch film having a thickness of 110 μm. This pre-stretch film was stretched in its lengthwise direction under conditions of stretching ratio of 2 times and stretching temperature of 108° C. to obtain a long-length λ/4 plate (thickness of 75 μm). The λ/4 plate thus obtained had a slow axis in a width direction of the λ/4 plate.

2-1-iv. Bonding

A sheet piece of the polarizing film, a sheet piece of the λ/2 plate, and a sheet piece of the λ/4 plate were obtained by cutting out the long-length polarizing film, the long-length λ/2 plate, and the long-length λ/4 plate, respectively. The sheet piece of the polarizing film, the sheet piece of the λ/2 plate, and the sheet piece of the λ/4 plate were bonded together in the same manner as in the step (1-i. Bonding) of Examples 1-1 to 1-9 to obtain a circularly polarizing plate including the polarizing film, a layer of the tacky agent, the λ/2 plate, a layer of the tacky agent, and the λ/4 plate in this order.

The circularly polarizing plate thus obtained was evaluated by the above-mentioned methods.

Example 2-2

2-2-i. Production of Polarizing Film

A long-length polarizing film was produced by the same method as that in the step (1-i. Production of Polarizing Film) of Examples 1-1 to 1-9.

2-2-ii. Production of λ/2 Plate

A long-length λ/2 plate having properties shown in Table 2 was produced by the same method as in the step (1-ii. Production of λ/2 Plate) of Example 1 except that a resin film made of a polycarbonate resin ("Iupilon S3000" manufactured by Mitsubishi Engineering-Plastics Corp., glass transition temperature of 150° C.) was used in place of the cyclic olefin resin film. The λ/2 plate thus obtained had a slow axis in a lengthwise direction of the λ/2 plate.

2-2-iii. Production of λ/4 Plate

An optically isotropic roll-like pre-stretch film made of a cycloolefin polymer having a thickness of 25 μm, a width of 500 mm, and a length of 500 m, was prepared as a transparent supporting body.

A diluted solution of steroid-modified polyamic acid is continuously applied onto the transparent supporting body to form a vertically oriented film having a thickness of 0.5 μm. Then the vertically oriented film was continuously subjected to a rubbing treatment in the direction forming an angle of 45° relative to a lengthwise direction of the transparent supporting body.

A coating liquid having a composition shown in Table 1 below was continuously applied onto the vertically oriented film described above using a bar coater to form a film of the coating liquid. The film of the coating liquid was dried, heated for orienting the discotic liquid crystalline molecule, and then irradiated with an ultraviolet ray for fixing the discotic liquid crystalline molecule to obtain an optical anisotropic layer having a thickness of 1.7 μm. In this manner, a λ/4 plate including the transparent supporting body and the optical anisotropic layer was obtained. The discotic liquid crystalline molecules were homogeneously oriented so as to have an optical axis (director) in a direction forming an angle of 45° relative to a lengthwise direction of the transparent supporting body. Further, the λ/4 plate had a slow axis in a direction orthogonal to the optical axis (director) (i.e., a direction forming an angle of 45° relative to the lengthwise direction of the transparent supporting body).

TABLE 1

| [Components of liquid crystalline compositions] | |
|---|---|
| Component | Amount |
| Discotic liquid crystalline molecule (A) described below | 32.6 wt % |
| Cellulose acetate butyrate | 0.7 wt % |
| Modified trimethylolpropane triacrylate (B) described below | 3.2 wt % |
| Sensitizer (C) described below | 0.4 wt % |
| Photopolymerization initiator (D) described below | 1.1 wt % |
| Methyl ethyl ketone | 62.0 wt % |

Discotic liquid crystalline molecule (A)

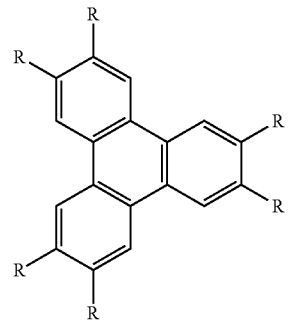

R: 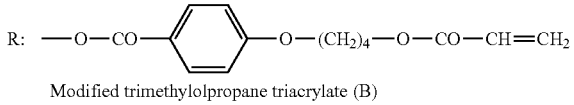

Modified trimethylolpropane triacrylate (B)

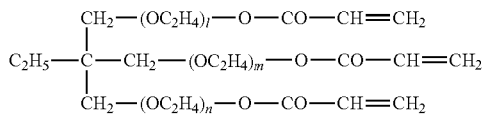

l + m + n = 3.5

Sensitizer (C)

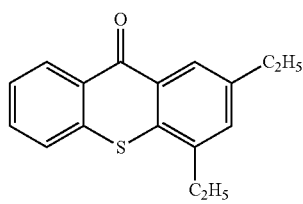

Photopolymerization initiator (D)

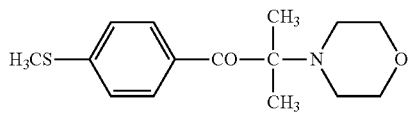

2-2-iv. Bonding

A sheet piece of the polarizing film, a sheet piece of the λ/2 plate, and a sheet piece of the λ/4 plate were obtained by cutting out the long-length polarizing film, the long-length λ/2 plate, and the long-length λ/4 plate, respectively. The sheet piece of the polarizing film, the sheet piece of the λ/2 plate, and the sheet piece of the λ/4 plate were bonded together in the same manner as in the step (1-i. Bonding) of Examples 1-1 to 1-9 to obtain a circularly polarizing plate including the polarizing film, a layer of the tacky agent, the λ/2 plate, a layer of the tacky agent, and the λ/4 plate in this order.

The circularly polarizing plate thus obtained was evaluated by the above-mentioned methods.

Examples 3-1 to 3-3

3-i. Production of Polarizing Film

A long-length polarizing film was produced by the same method as that in the step (1-i. Production of Polarizing Film) of Examples 1-1 to 1-9.

3-ii. Production of λ/2 Plate

A long-length λ/2 plate having properties shown in Table 2 was produced by the same method as that in the step (1-ii. Production of λ/2 Plate) of Examples 1-1 to 1-9.

3-iii. Production of λ/4 Plate

A long-length λ/4 plate having properties shown in Table 2 was produced by the same method as that in the step (1-iii. Production of λ/4 Plate) of Examples 1-1 to 1-9.

3-iv. Bonding

A sheet piece of the polarizing film, a sheet piece of the λ/2 plate, and a sheet piece of the λ/4 plate were obtained by cutting out the long-length polarizing film, the long-length λ/2 plate, and the long-length λ/4 plate, respectively.

The sheet piece of the λ/2 plate was bonded to the sheet piece of the polarizing film using a tacky agent such that a slow axis of the λ/2 plate forms an angle θh indicated in Table 2 in a counterclockwise direction relative to the absorption axis of the polarizing film as viewed from a side of the polarizing film. Further, the sheet piece of the λ/4 plate was bonded to the λ/2 plate using the tacky agent such that a slow axis of the λ/4 plate forms an angle θh indicated in Table 2 in a counterclockwise direction relative to the absorption axis of the polarizing film as viewed from the side of the polarizing film. In this manner, a circularly polarizing plate including the polarizing film, a layer of the tacky agent, the λ/2 plate, a layer of the tacky agent, and the λ/4 plate in this order was obtained.

The circularly polarizing plate thus obtained was evaluated by the above-mentioned methods.

Comparative Example 1

C1-i. Production of Polarizing Film

A long-length polarizing film was produced by the same method as that in the step (1-i. Production of Polarizing Film) of Examples 1-1 to 1-9.

C1-ii. Production of λ/2 Plate

The same long-length cyclic olefin resin film as the long-length cyclic olefin resin film obtained in the step (1-ii. Production of λ/2 Plate) of Examples 1-1 to 1-9 was prepared as a pre-stretch film. The cyclic olefin resin film was stretched using a tenter stretching machine in a width direction of the cyclic olefin resin film to obtain a long-length λ/2 plate. The stretch conditions in this Comparative Example were set in a range of 120° C. to 150° C. for the stretching temperature and a range of 2.0 times to 5.0 times for the stretching ratio, so as to obtain a λ/2 plate having properties shown in Table 2 below.

C1-iii. Production of λ/4 Plate

The same long-length pre-stretch film as the long-length pre-stretch film obtained in the step (1-iii. Production of λ/4 Plate) of Examples 1-1 to 1-9 was prepared. The pre-stretch film was stretched using a tenter stretching machine in a width direction of the pre-stretch film to obtain a long-length λ/4 plate. The stretch conditions in this Comparative Example were set in a range of 110° C. to 140° C. for the stretching temperature and a range of 1.5 times to 4.0 times for the stretching ratio, so as to obtain a λ/4 plate having properties shown in Table 2 below.

C1-iv. Bonding

A sheet piece of the polarizing film, a sheet piece of the λ/2 plate, and a sheet piece of the λ/4 plate were obtained by cutting out the long-length polarizing film, the long-length λ/2 plate, and the long-length λ/4 plate, respectively. The sheet piece of the polarizing film, the sheet piece of the λ/2 plate, and the sheet piece of the λ/4 plate were bonded together in the same manner as in the step (1-i. Bonding) of Examples 1-1 to 1-9 to obtain a circularly polarizing plate including the polarizing film, a layer of the tacky agent, the λ/2 plate, a layer of the tacky agent, and the λ/4 plate in this order.

The circularly polarizing plate thus obtained was evaluated by the above-mentioned methods.

Comparative Example 2

C2-i. Production of Polarizing Film

A long-length polarizing film was produced by the same method as that in the step (1-i. Production of Polarizing Film) of Examples 1-1 to 1-9.

C2-ii. Production of λ/2 Plate

A long-length λ/2 plate having properties shown in Table 2 was produced by the same method as that in the step (1-iii. Production of λ/4 Plate) of Examples 1-1 to 1-9.

C2-iv. Production of Circularly Polarizing Plate

A sheet piece of the polarizing film, a sheet piece of the λ/2 plate, and a sheet piece of the λ/4 plate were obtained by cutting out the long-length polarizing film, the long-length λ/2 plate, and the long-length λ/4 plate, respectively.

The sheet piece of the λ/2 plate was bonded to the sheet piece of the polarizing film using a tacky agent such that a slow axis of the λ/2 plate forms an angle θh indicated in Table 2 in a counterclockwise direction relative to the absorption axis of the polarizing film as viewed from a side of the polarizing film. Further, the sheet piece of the λ/4 plate was bonded to the λ/2 plate using the tacky agent such that a slow axis of the λ/4 plate forms an angle θh indicated in Table 2 in a counterclockwise direction relative to the absorption axis of the polarizing film as viewed from the side of the polarizing film. In this manner, a circularly polarizing plate including the polarizing film, a layer of the tacky agent, the λ/2 plate, a layer of the tacky agent, and the λ/4 plate in this order was obtained.

The circularly polarizing plate thus obtained was evaluated by the above-mentioned methods.

Results

Configurations of Examples and Comparative Examples described above and their results are shown in Table 2 and Table 3 below, respectively. It is noted that the meanings of abbreviations used in Tables below are as follows.

COP: Cyclic olefin resin
PSt: Styrene-maleic acid copolymer resin
PMMA: Polymethyl methacrylate
PC: Polycarbonate resin
LQ: discotic liquid crystalline molecule IDR: Intrinsic birefringence value P: positive, N: negative
Re: In-plane phase difference at measurement wavelength of 590 nm
Rth: Thickness-direction phase difference at measurement wavelength of 590 nm
θh: Angle formed by slow axis of λ/2 plate in counter-clockwise direction relative to absorption axis of polarizing film when circularly polarizing plate is viewed from polarizing film side θq: Angle formed by slow axis of λ/4 plate in counter-clockwise direction relative to absorption axis of polarizing film when circularly polarizing plate is viewed from polarizing film side NZh: NZ factor of λ/2 plate
NZq: NZ factor of λ/4 plate

TABLE 2

[Configurations of Examples and Comparative Examples]

| | λ/2 plate | | | | | | λ/4 plate | | | | | Difference |
|---|---|---|---|---|---|---|---|---|---|---|---|---|
| | Resin | IDR | Re (nm) | Rth (nm) | θh | NZh | Resin | IDR | Re (nm) | Rth (nm) | θq | NZq | in wavelength dispersion |

Ex.

| 1-1 | COP | P | 250 | 125 | 22.5° | 1.00 | PSt | N | 118 | −59 | 90.0° | 0.00 | 0.116 |
| 1-2 | COP | P | 255 | 128 | 22.5° | 1.00 | PSt | N | 121 | −61 | 90.0° | 0.00 | 0.116 |
| 1-3 | COP | P | 260 | 130 | 22.5° | 1.00 | PSt | N | 125 | −62 | 90.0° | 0.00 | 0.116 |
| 1-4 | COP | P | 265 | 133 | 22.5° | 1.00 | PSt | N | 128 | −64 | 90.0° | 0.00 | 0.116 |
| 1-5 | COP | P | 270 | 135 | 22.5° | 1.00 | PSt | N | 132 | −66 | 90.0° | 0.00 | 0.116 |
| 1-6 | COP | P | 275 | 138 | 22.5° | 1.00 | PSt | N | 135 | −67 | 90.0° | 0.00 | 0.116 |
| 1-7 | COP | P | 280 | 140 | 22.5° | 1.00 | PSt | N | 138 | −69 | 90.0° | 0.00 | 0.116 |
| 1-8 | COP | P | 285 | 143 | 22.5° | 1.00 | PSt | N | 142 | −71 | 90.0° | 0.00 | 0.116 |
| 1-9 | COP | P | 290 | 145 | 22.5° | 1.00 | PSt | N | 145 | −73 | 90.0° | 0.00 | 0.116 |
| 2-1 | COP | P | 260 | 130 | 22.5° | 1.00 | PMMA | N | 126 | −63 | 90.0° | 0.00 | 0.029 |
| 2-2 | PC | P | 260 | 130 | 22.5° | 1.00 | LQ | N | 126 | −63 | 90.0° | 0.00 | 0.199 |
| 3-1 | COP | P | 260 | 130 | 15.0° | 1.00 | PSt | N | 128 | −64 | 75.0° | 0.00 | 0.116 |
| 3-2 | COP | P | 260 | 130 | 18.0° | 1.00 | PSt | N | 126 | −63 | 81.0° | 0.00 | 0.116 |
| 3-3 | COP | P | 260 | 130 | 27.0° | 1.00 | PSt | N | 123 | −62 | 99.0° | 0.00 | 0.116 |

Comp. Ex.

| 1 | COP | P | 260 | 192 | 22.5° | 1.24 | PSt | N | 125 | −96 | 90.0° | −0.27 | 0.116 |
| 2 | COP | P | 260 | 130 | 45.0° | 1.00 | PSt | N | 120 | −60 | 135.0° | 0.00 | 0.116 |

TABLE 3

[Results of Examples and Comparative Examples]

| | Front direction | | Tilt Direction | |
|---|---|---|---|---|
| Example | Reflectivity | Visual observation | Reflectivity | Visual observation |
| 1-1 | 0.10% | B | 1.08% | A |
| 1-2 | 0.08% | A | 1.11% | A |
| 1-3 | 0.06% | A | 1.15% | A |
| 1-4 | 0.05% | A | 1.20% | A |
| 1-5 | 0.04% | A | 1.27% | A |
| 1-6 | 0.04% | A | 1.34% | A |
| 1-7 | 0.05% | A | 1.42% | A |
| 1-8 | 0.06% | A | 1.51% | A |
| 1-9 | 0.07% | A | 1.61% | A |
| 2-1 | 0.11% | B | 1.21% | A |
| 2-2 | 0.11% | B | 1.14% | A |
| 3-1 | 0.08% | A | 1.09% | A |
| 3-2 | 0.05% | A | 1.09% | A |
| 3-3 | 0.12% | C | 1.26% | A |

TABLE 3-continued

[Results of Examples and Comparative Examples]

| | Front direction | | Tilt Direction | |
|---|---|---|---|---|
| | Reflectivity | Visual observation | Reflectivity | Visual observation |
| Comparative Example | | | | |
| 1 | 0.06% | A | 2.27% | C |
| 2 | 0.34% | E | 1.66% | A |

Discussions

As evident from Examples and Comparative Examples described above, it was confirmed that reflection of outside light in both a front direction and a tilt direction can be effectively reduced according to the present invention.

In particular, on the basis of Examples 1-1 to 1-9, it was confirmed that the λ/2 plate and the λ/4 plate each had a preferable range in a phase difference.

Further, on the basis of Examples 2-1 and 2-2, it was confirmed that there was a preferable range in difference in wavelength dispersions between the λ/2 plate and the λ/4 plate.

Further, on the basis of Examples 3-1 to 3-3, it was confirmed that the λ/2 plate and the λ/4 plate each had a preferable range in a direction of a slow axis.

DESCRIPTION OF NUMERALS

100 circularly polarizing plate
110 polarizing film
111 absorption axis of polarizing film 112 axis as projected line of absorption axis of polarizing film on the surface of λ/2 plate
113 axis as projected line of absorption axis of polarizing film on the surface of λ/4 plate
120 λ/2 plate
121 slow axis of λ/2 plate
130 λ/4 plate
131 slow axis of λ/4 plate
140 broadband λ/4 plate

The invention claimed is:
1. A circularly polarizing plate comprising:
a polarizing film;
a λ/2 plate having a slow axis in a direction forming an angle of 22.5°±10° relative to an absorption axis of the polarizing film; and
a λ/4 plate having a slow axis in a direction forming an angle of 90°±20° relative to the absorption axis of the polarizing film, in this order, wherein
the λ/2 plate and the λ/4 plate have different wavelength dispersions,
an NZ factor of the λ/2 plate is 1.00±0.05, and
an NZ factor of the λ/4 plate is 0.00±0.05, wherein
the NZ factor is a value represented by (nx−nz)/(nx−ny), where nx represents a refractive index in a direction in which the maximum refractive index is given among directions perpendicular to the thickness direction (in-plane directions), ny represents a refractive index in one of the in-plane directions that is orthogonal to the nx direction, and nz represents a refractive index in a thickness direction.

2. The circularly polarizing plate according to claim 1, satisfying the following formula (A):

Reh(400)/Reh(550)<Req(400)/Req(550)

wherein Reh(400) is an in-plane phase difference of the λ/2 plate at a wavelength of 400 nm,
Reh(550) is an in-plane phase difference of the λ/2 plate at a wavelength of 550 nm,
Req(400) is an in-plane phase difference of the λ/4 plate at a wavelength of 400 nm, and
Req(550) is an in-plane phase difference of the λ/4 plate at a wavelength of 550 nm.

3. The circularly polarizing plate according to claim 1, satisfying the following formula (B):

Req(400)/Req(550)−Reh(400)/Reh(550)=0.12±0.08 wherein Reh(400) is an in-plane phase difference of the λ/2 plate at a wavelength of 400 nm,
Reh(550) is an in-plane phase difference of the λ/2 plate at a wavelength of 550 nm,
Req(400) is an in-plane phase difference of the λ/4 plate at a wavelength of 400 nm, and
Req(550) is an in-plane phase difference of the λ/4 plate at a wavelength of 550 nm.

4. The circularly polarizing plate according to claim 1, wherein the λ/4 plate includes a layer formed of a material having a negative intrinsic birefringence value.

5. The circularly polarizing plate according to claim 1, wherein the λ/2 plate includes a layer formed of a material having a positive intrinsic birefringence value.

6. An organic electroluminescent display device comprising the circularly polarizing plate according to claim 1.

7. A liquid crystal display device comprising the circularly polarizing plate according to claim 1.

8. A broadband λ/4 plate comprising:
a λ/2 plate having a slow axis in a direction forming an angle of 22.5°±10° relative to a reference direction; and
a λ/4 plate having a slow axis in a direction forming an angle of 90°±20° relative to the reference direction,
wherein the λ/2 plate and the λ/4 plate have different wavelength dispersions,
an NZ factor of the λ/2 plate is 1.00±0.05, and
an NZ factor of the λ/4 plate is 0.00±0.05, wherein
the NZ factor is a value represented by (nx−nz)/(nx−ny), where nx represents a refractive index in a direction in which the maximum refractive index is given among directions perpendicular to the thickness direction (in-plane directions), ny represents a refractive index in one of the in-plane directions that is orthogonal to the nx direction, and nz represents a refractive index in a thickness direction.

9. A method for producing a circularly polarizing plate, comprising the steps of:
stretching a first pre-stretch film including a layer formed of a material having a positive intrinsic birefringence value in one direction to obtain a λ/2 plate having a slow axis in a stretching direction;
stretching a second pre-stretch film including a layer formed of a material having a negative intrinsic birefringence value in one direction to obtain a λ/4 plate having a slow axis in a direction perpendicular to a stretching direction;
bonding a polarizing film and the λ/2 plate together such that a slow axis of the λ/2 plate forms an angle of 22.5°±10° relative to an absorption axis of the polarizing film; and
bonding the λ/2 plate and the λ/4 plate together such that a slow axis of the λ/4 plate forms an angle of 90°±20° relative to the absorption axis of the polarizing film, wherein
the λ/2 plate and the λ/4 plate have different wavelength dispersions,
an NZ factor of the λ/2 plate is 1.00±0.05, and
an NZ factor of the λ/4 plate is 0.00±0.05, wherein
the NZ factor is a value represented by (nx−nz)/(nx−ny), where nx represents a refractive index in a direction in which the maximum refractive index is given among directions perpendicular to the thickness direction (in-plane directions), ny represents a refractive index in one of the in-plane directions that is orthogonal to the nx direction, and nz represents a refractive index in a thickness direction.

10. A method for producing a circularly polarizing plate, comprising the steps of:
stretching a first pre-stretch film including a layer formed of a material having a positive intrinsic birefringence value in one direction to obtain a λ/2 plate having a slow axis in a stretching direction;
forming a layer containing a discotic liquid crystalline molecule on a supporting body, orienting the discotic liquid crystalline molecule, and fixing the discotic liquid crystalline molecule to obtain a λ/4 plate;
bonding a polarizing film and the λ/2 plate together such that a slow axis of the λ/2 plate forms an angle of 22.5°±10° relative to an absorption axis of the polarizing film; and
bonding the λ/2 plate and the λ/4 plate together such that a slow axis of the λ/4 plate forms an angle of 90°±20° relative to the absorption axis of the polarizing film, wherein
the λ/2 plate and the λ/4 plate have different wavelength dispersions,
an NZ factor of the λ/2 plate is 1.00±0.05, and
an NZ factor of the λ/4 plate is 0.00±0.05, wherein
the NZ factor is a value represented by (nx−nz)/(nx−ny), where nx represents a refractive index in a direction in which the maximum refractive index is given among directions perpendicular to the thickness direction (in-plane directions), ny represents a refractive index in one of the in-plane directions that is orthogonal to the nx direction, and nz represents a refractive index in a thickness direction.

* * * * *